(12) United States Patent
Hirai et al.

(10) Patent No.: US 6,450,309 B1
(45) Date of Patent: Sep. 17, 2002

(54) TRANSMISSION SYSTEM STRUCTURE OF VEHICLE

(75) Inventors: Tadao Hirai; Takeshi Hasebe; Takashi Hirano, all of Osaka; Masahisa Kawamura, Hyogo, all of (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/720,342

(22) PCT Filed: Feb. 7, 2000

(86) PCT No.: PCT/JP00/00663

§ 371 (c)(1),
(2), (4) Date: Jan. 29, 2001

(87) PCT Pub. No.: WO00/64695

PCT Pub. Date: Nov. 2, 2000

(30) Foreign Application Priority Data

Apr. 23, 1999 (JP) .............................. 11-117115
Apr. 23, 1999 (JP) .............................. 11-117116

(51) Int. Cl.⁷ ........................ B60K 41/22; B60K 23/02; F16D 48/02
(52) U.S. Cl. .................. 192/3.63; 192/48.3; 192/87.13
(58) Field of Search ............... 192/3.57, 3.58, 192/3.63, 87.13, 87.15, 87.18, 48.3, 57

(56) References Cited

U.S. PATENT DOCUMENTS

| | | | | |
|---|---|---|---|---|
| 3,774,460 A | * | 11/1973 | Browning et al. | 192/48.7 |
| 4,186,829 A | * | 2/1980 | Schneider et al. | 192/109 F |
| 4,476,737 A | * | 10/1984 | Young | 74/329 |
| 4,881,417 A | * | 11/1989 | Yoshii et al. | 74/15.66 |
| 4,938,085 A | * | 7/1990 | Suzuki et al. | 74/15.2 |
| 6,003,391 A | * | 12/1999 | Kojima et al. | 180/53.1 |
| 6,119,552 A | * | 9/2000 | Matsufuji | 74/15.66 |

FOREIGN PATENT DOCUMENTS

| | | | |
|---|---|---|---|
| JP | 62-233527 A | * | 10/1987 |
| JP | 1-303347 A | * | 12/1989 |
| JP | 2-159420 A | * | 6/1990 |
| JP | 2-164502 A | * | 6/1990 |
| JP | 3-292223 A | * | 12/1991 |
| JP | 6-307543 A | * | 11/1994 |

* cited by examiner

Primary Examiner—Rodney H. Bonck
(74) Attorney, Agent, or Firm—Sterne, Kessler, Goldstein & Fox P.L.L.C.

(57) ABSTRACT

A transmission system for vehicle transmission mechanism (B) having a low speed hydraulic clutch (CL) and a high speed hydraulic clutch (CH) as a wet multi-disk clutch for transmission, wherein both the low speed hydraulic clutch (CL) and the high speed hydraulic clutch (CH) are disengaged so as to disconnect a transmission of an engine power to the transmission system, namely, so as to bring a main clutch into off condition, a dry clutch device (A) is installed on the upstream side of transmission of the transmission mechanism as a corotation prevention mechanism, only the low speed hydraulic clutch (CL) of large capacity is used as an inching clutch to bring the main clutch into a partial engaged condition when the main clutch is moved to on or off in the transmission mechanism (B) and, when the main clutch is operated from off to on with a shift lever (91) set at a high speed position, hydraulic pressure control is performed so that the high speed hydraulic clutch (CH) is brought into off condition and the low speed hydraulic clutch (CL) is brought into the partial engaged condition in the off range (D3) and inching range (D2) of the main clutch, of a clutch pedal (111), respectively.

22 Claims, 20 Drawing Sheets

Fig.19
| stroke | state of clutch | switch 115 | switch 116 |
|---|---|---|---|
| D1 | 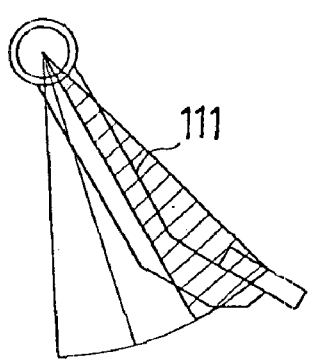 111 | ON | OFF |
| D2 | 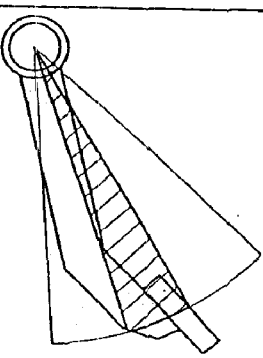 | OFF | OFF |
| D3 | 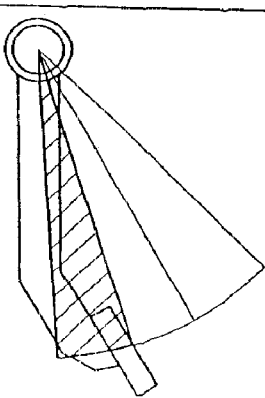 | OFF | ON |

TRANSMISSION SYSTEM STRUCTURE OF VEHICLE

FIELD OF THE INVENTION

The present invention relates to a transmission system using a wet type multi-plate clutch for shifting or as a main clutch, wherein the power train is adopted in working vehicles particularly such as tractors and the like.

RELATED ART

In working vehicles such as tractors and the like or ordinary vehicles, a dry type clutch to be pressed against a flywheel of an engine is generally used as a main clutch, which is engaged/disengaged between an engine and a shift mechanism and is half-clutched for generating inching during a transition period between states of engaging and disengaging. In many cases, a dry type multi-plate clutch is used so as to secure transmission torque while being engaged and frictional resistance while being half-clutched. However, since the multi-plate clutch is complex and axially elongated, if possible, a single-plate clutch being simple and compact is desired.

In some cases, a wet type (hydraulic type) multi-plate clutch may be used as the above-mentioned main clutch. However, it has the problem that, while the clutch being disengaged, power is transmitted slightly due to the viscosity of lubricant oil therein so as to generate a creep phenomenon. To protect this problem, it has been considered that a brake is provided in a power train located on the downstream of the wet type multi-plate clutch to brake the downstream power train, and actually this idea becomes known. When such a brake is operated, the downstream side of the clutch is isolated with power transmission, however, the power train on the upstream side of the clutch is still rotated following the engine power. Therefore, the load resulting from the viscosity of lubricant oil in the wet type multi-plate clutch is exerted on the power train on the upstream side of the clutch. The load is further put on the engine at idle, thereby causing incomplete combustion at worst so as to generate the problem that a carbon deposit is accumulated in an engine cylinder.

Then, it is considerable that the creep phenomenon, i.e., a drag of shift mechanism and the like on the downstream side of the disengaged wet type multi-plate clutch resulting from the viscosity of lubricant oil of the wet type multi-plate clutch is prevented by using a conventional dry type clutch whose clutch disc is pressed against the flywheel on the upstream side of the wet type multi-plate clutch. In this case, the dry type clutch is disengaged to isolate only the dragging driving power train with transmission of engine power. Therefore, the dry type clutch can be constituted by a single-plate type clutch, which is simple and compact. This clutch is detached from the flywheel to be disengaged, thereby greatly reducing load on the engine at idle so as to effect an engine protection.

Further, conventionally, there is a well-known working vehicle particularly such as a tractor or the like, which is provided with a shift mechanism including a plurality of parallel power trains with different reduction ratios, wherein the power trains are provided with respective wet type multi-plate clutches. In these shift mechanisms, there is a well-known shift mechanism in which one of the plurality of wet type clutches is selectively engaged and one corresponding speed stage is formed through the power train having the engaged clutch. These wet type multi-plate clutches for shifting are, as they are, used also as a main clutch when all the wet type multi-type clutches are disengaged so as to isolate the transmission system with transmission of engine power. In this case, it is not unnecessary to provide the foregoing wet type multi-plate clutch as a main clutch separately. In this case, the foregoing detriment of the drag inherent to a wet type multi-plate clutch can be dissolved by providing a drag-preventing clutch such as a dry type single-plate clutch which is arranged on the upstream side of the shift mechanism as described above and pressed against the flywheel. Also, therefore, a simple and compact transmission system can be configured.

However, when the wet type multi-plate clutches used for shifting is diverted to a main clutch as they are, each wet type multi-plate clutch possibly come to be half-clutched because a shift operation (operation selecting speed stages) and a main clutch operation are performed separately from each other. To generate a state of half-clutch, each clutch is required to have the larger volume to secure the durability against a load. However, the whole size of shift mechanism becomes significantly large if all the wet type multi-plate clutches used in the shift mechanism have so large volume. Then, it is thought of that only one wet type multi-plate clutch in the shift mechanism has a sufficiently larger volume and a speed stage corresponding to this clutch is selected for the main clutch operation. However, it is too burdensome to be required for such a shift operation in every main clutch operation.

Furthermore, there is the problem associated with the shift operation in such a shift mechanism comprising a plurality of wet type multi-plate clutches that, during the shifting, the fluctuation of hydraulic pressure arises necessarily because the shifting is attended with such a control that hydraulic oil is drained from the clutch previously supplied with the hydraulic oil and the hydraulic oil is supplied to another clutch. When the drainage of hydraulic oil from the clutch and the supply to the other clutch is performed rapidly or the timings of the drainage and the supply are apart, the fluctuation becomes rapid and impact is developed.

DISCLOSURE OF THE INVENTION

A first object of the present invention is to provide a transmission system for a vehicle, wherein, while a wet type multi-plate clutch having high transmission torque and high frictional resistance during its half-clutching is used as a main clutch, a creep phenomenon does not occur when the transmission system is isolated with transmission of engine power and the power trains thereof may be secured to be compact.

According to a vehicle transmission system of the present invention, a plurality of wet type multi-plate clutches for shifting, among which one clutch is selectively engaged to form one speed stage, is utilized as a main clutch. All the wet type multi-plate clutches for shifting are disengaged when the transmission system is isolated with transmission of engine power. Furthermore, a dry type single-plate clutch is provided as a drag-preventing mechanism on the upstream side of the shift mechanism in the transmission system. The dry type single-plate clutch is disengaged when all the wet type multi-plate clutches for shifting are disengaged.

One wet type multi-plate clutch to be half-clutched for generating inching during a transition period of a main clutch between its disengaging and engaging is specified among the plurality of wet type multi-plate clutches for shifting. Only the specified clutch has the largest volume so as to resist against frequent use, thereby securing the whole shift mechanism to be compact. A clutch corresponding to the lowest speed stage in the shift mechanism is used as the clutch for inching.

In this structure, the vehicle transmission system is hydraulically controlled so that, when the main clutch operation is performed while one speed stage corresponding to one wet type multi-plate clutch other than the clutch for inching is determined, only the clutch for inching is half-clutched in the shift mechanism in a transition period between clutching-on and clutching-off during the main clutch operation regardless of the determined speed stage. Therefore, the selected clutch for shifting other than the clutch for inching is prevented from being half-clutched.

The plurality of wet type clutches for shifting in the shift mechanism are engaged with the supply of hydraulic oil and disengaged with the drainage of hydraulic oil.

The drag-preventing clutch apparatus is disengaged and completes engaging while the plurality of wet type clutches play up to a rise of minimum hydraulic fluid pressure therein. In this regard, the drag-preventing clutch apparatus is half-clutched when the wet type clutches play, thereby reducing friction load generated thereon during its half-clutching so as to secure the durability of the drag-preventing clutch apparatus. Also, the main clutch operation between its clutch-on and clutch-off states is performed smoothly.

The drag-preventing clutch apparatus and the shift mechanism are contained in one housing so as to configure a compact portion of the vehicle transmission system for both main-clutching and shifting. Further, by locating an actuator for the drag-preventing clutch apparatus above the outside of the housing, the housing becomes compact and it becomes easy to assemble and maintain the actuator and a link mechanism between the actuator and the drag-preventing clutch apparatus.

Furthermore, the actuator for the drag-preventing clutch apparatus is hydraulically controlled, whereby the hydraulic oil, which is an operating power source of the wet type multi-plate clutches for shifting, may be used also as an operating power source of the actuator. Further, by incorporating control means for supplying and drainage the hydraulic oil in a hydraulic control mechanism of the wet type multi-plate clutches, a hydraulic oil circuit for the actuator may be easily configured to be compact in association with the hydraulic control mechanism for shifting.

Main clutch operation means for switching transmission and isolation of engine power to and from said power train, respectively, is provided. The full range of stroke of the main clutch operation means is divided into a main-clutch-on range where one of the wet type clutches for shifting corresponding to a determined speed stage is selectively engaged, an inching range where the clutch for inching is half-clutched, and a main-clutch-off range where all the wet type clutches for shifting are disengaged. The drag-preventing clutch apparatus is disengaged and completes engaging while the main clutch operation means is located in the main-clutch-off range. The engaging hydraulic pressure of the clutch for inching increases as the stroke of the main clutch operation means is varied from the main-clutch-off range towards the main-clutch-on range.

In such a structure, an oil path switching valve is provided as one of hydraulic control devices controlling a flow path of hydraulic oil for each wet type clutch for shifting of the shift mechanism. In the case that one wet type clutch to be selected from the wet type clutches and engaged based on a determined speed range setting of the shift mechanism is a clutch other than the clutch for inching, when the main clutch operation means is located in either the main-clutch-off range and the inching range, the oil path switching valve connects a supply path of hydraulic oil to the clutch for inching, and connects a drain oil path to the wet type clutch for shifting selected from the wet type clutches based on the determined speed stage, which should be engaged essentially. BY such a structure of hydraulic control, while a speed stage corresponding to one wet type clutch other than the clutch for inching is determined, it is not required to shift to the speed stage corresponding to the clutch for inching once during the main clutch operation. The clutch for inching is automatically half-clutched and the other wet type clutches is disengaged during a transition of a main clutch between its engaging and disengaging states. Accordingly, it is possible to provide a main clutch mechanism which generates a state of half-clutch in only the specific clutch for inching without a burdensome operation.

The oil path switching valve is made of an electromagnetic solenoid which is switched based on the detection of a position of shift operation means for determining a speed stage of the shift mechanism and on the detection of a position of the main clutch operation means. Therefore, the hydraulic control for making the clutch for inching half-clutched may be performed at the appropriate times by electric power through simple configuration.

Further, a border between the inching range and the main-clutch-on range in the main clutch operation means may be set to the stroke position where the clutch-engaging hydraulic pressure reaches the maximum hydraulic pressure. Alternatively, it may be set to the stroke position where the clutch-engaging hydraulic pressure is less than the maximum hydraulic pressure.

According to the former case, the clutch for inching with a large volume, which is resistant against frequent use as described above can be used in a whole operating range thereof from a rise of hydraulic oil pressure up to the maximum pressure, thereby securing its durability in frequent inching. However, in this setting of the border, on starting of the vehicle with the main clutch disengaged while a clutch for shifting other than the clutch for inching is engaged, the clutch for inching is completely engaged, and then, an exchange of hydraulic pressure takes place between the clutch for inching and the clutch for shifting corresponding to the determined speed stage. Therefore, during the main clutch operation, another speed stage is formed as if a shifting operation is performed after the speed stage corresponding to the clutch for inching is generated, whereby fluctuations of hydraulic pressure is large.

On the other hand, in the latter case, though a volume of the clutch for inching is not utilized at maximum as an inching application, when a vehicle starting from the main clutch disengaged with a speed range corresponding to a wet type clutch other than the clutch for inching determined, hydraulic pressure does not fluctuate so much and it is possible to transit smoothly from the main-clutch-off state to the determined speed stage set because hydraulic pressure of the wet type clutch corresponding to the determined speed stage rises before the clutch for inching reaches the maximum hydraulic pressure.

Further, a border between the main-clutch-off range and the inching range is set to the stroke position of the main clutch operation means, where the minimum engaging hydraulic pressure required for the clutch for inching rises. In the main-clutch-off range, all the wet type clutches for shifting play till the minimum hydraulic pressure rises in each of the wet type clutches. Accordingly, the drag-preventing clutch apparatus is completely engaged in inching as described above, thereby securing durability of the drag-preventing clutch apparatus. Also, the transition from the main-clutch-off range the inching range becomes smooth so that a spontaneous main clutch operation may be attained.

A second object of the present invention is to configure a vehicle transmission system including a shift mechanism having a plurality of wet type clutches for shifting among which one clutch is selectively engaged to form one speed range, wherein intensive fluctuations of hydraulic pressure associated with the switch of speed stage is not generated so as to establish a smooth shifting.

To achieve this object, according to the present invention, in a shift control mechanism controlling the flow of hydraulic oil for controlling engagement/disengagement of each wet type clutch for shifting, a throttling mechanism is provided in an oil path which is connected to each wet type clutch and allows hydraulic oil to flow therethrough when the wet type clutch is disengaged. Therefore, the hydraulic pressure fluctuates gradually when the wet type clutch for shifting which has been engaged before the switching of speed stage is disengaged.

In addition to this, a delay relief valve is provided to delay a hydraulic pressure rise in an oil path which communicates hydraulic oil to the wet type clutch for shifting selectively engaged after switching. Therefore, the hydraulic oil pressure of both the wet type clutch for shifting to be disengaged and the wet type clutch for shifting to be engaged in association with a shift operation fluctuates gradually and the state of half-clutch is emerged during the transition period in shifting. Accordingly, it is possible to provide a favorable shift mechanism without an impact resulting from fluctuations of hydraulic pressure associated with shifting while using wet type clutches.

These and other objects, structures and effects of the invention will appear in the following detailed description based on the accompanying drawing.

BRIEF DESCRIPTION OF THE DRAWINGS

FIG. 19 is a table including pictorial clutch pedals 111 showing a relation among three stroke ranges of clutch pedal 111, states of on/off of position-detecting switches 115 and 116;

DESCRIPTION OF THE PREFERRED EMBODIMENTS

Figure 1:
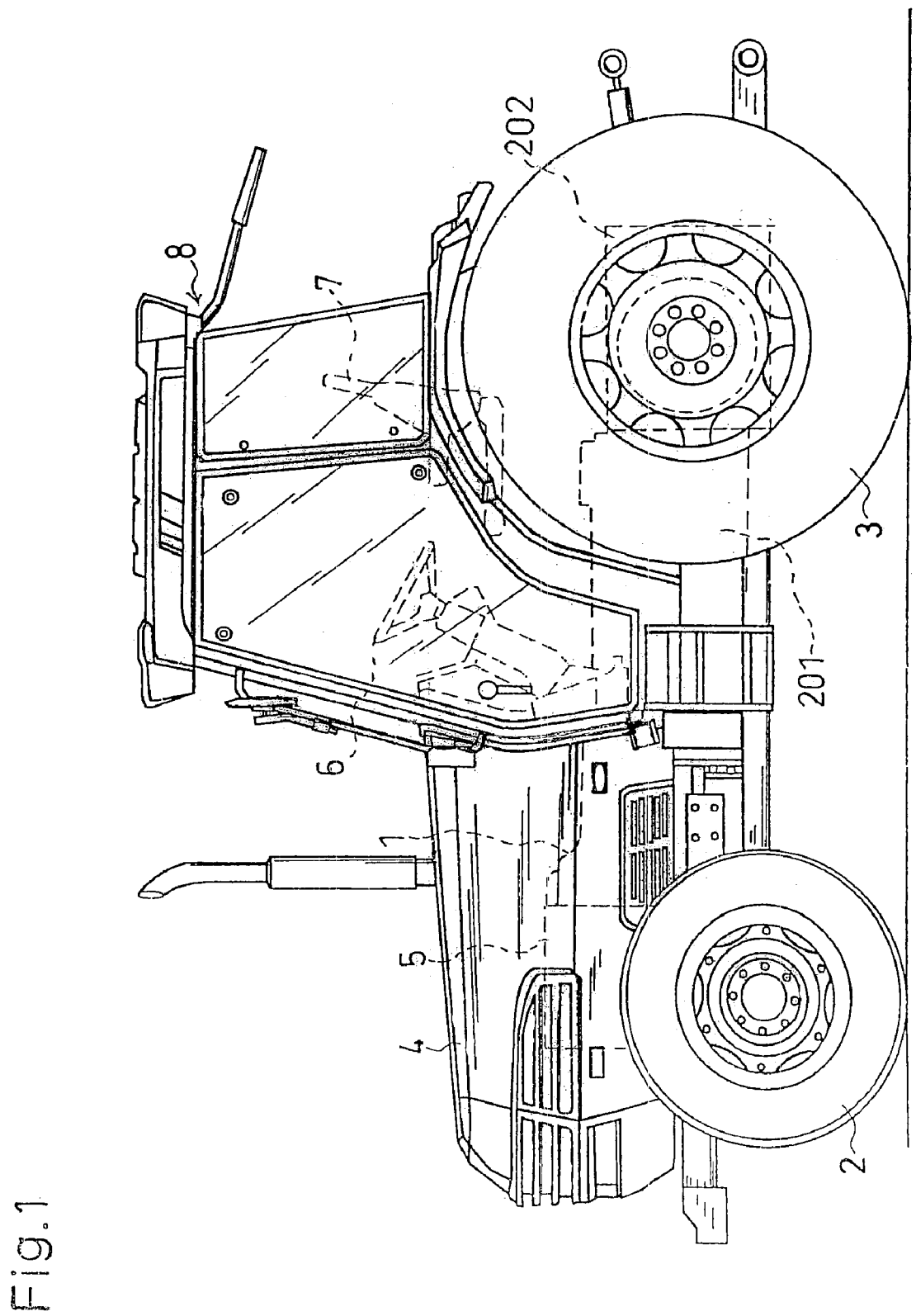
FIG. 1 is a side view of a tractor adopting a transmission system in accordance with the invention.

At first, there is described the overall configuration of a working vehicle having a cabin in accordance with the present invention according to FIG. 1. A bonnet 4 is located over the front portion of a main vehicle body suspending front wheels 2 and rear wheels 3 on its front and rear portions. An engine 5 is incorporated within bonnet 4. A steering wheel 6 is provided to rearward of bonnet 4 and a seat 7 is located to rearward of steering wheel 6.

Steering wheel 6 and seat 7 are covered with a cabin 8. A clutch housing 1, a transmission housing 201 and a rear axle housing 202 are located consecutively backward from the rear end of engine 5.

Output of engine 5 is separated to two transmission systems, a PTO transmission system and a driving transmission system in clutch housing 1. In clutch housing 1, a dry type clutch apparatus A as a drag-preventing mechanism and a shift mechanism B with two speed stages of high and low are formed in tandem on the driving power train. For function as a main clutch mechanism, dry type clutch apparatus A is used and hydraulic clutches CL and CH in shift mechanism B are also used together with dry type clutch apparatus A. The driving transmission system configures a shift mechanism, not sown, in transmission housing 201 and a transmission mechanism such as a differential and the like, not shown, in rear axle housing 202, and finally reaches rear wheels 3 as drive wheels. The PTO power train is configured to pass through transmission housing 201 and rear axle housing 202 and finally leads to a PTO shaft, not sown, projecting backward from a rear end of rear axle housing 202.

Usually, the shift mechanism, not shown, located in transmission housing 201 is referred to as a main shift mechanism, and shift mechanism B with two speed stages of high and low in clutch housing 1 configured upstream of the input portion of the main shift mechanism as mentioned above is referred as a sub shift mechanism. However, in the following description, the mechanism B for shifting with two speed stages of high and low in clutch housing 1 is referred as a shift mechanism since the shift mechanism in transmission housing 201 is not referred. Therefore, a term "shift" indicates the shift using this shift mechanism B.

Then, an internal structure of clutch housing 1 will be described referring to FIGS. 2 to 5.

A front portion of clutch housing 1 is attached fixedly to the engine and a rear portion thereof is attached fixedly to transmission housing 201. The inside of housing 1 is divided into a front chamber 1F and a rear chamber 1R by a bulkhead 14.

A mechanical structure in front chamber 1F of the clutch housing 1 is described. A flywheel 28 attached fixedly to a rear end of a crankshaft of engine 5 is located at a front-end part of front chamber 1F. A tip of a PTO clutch front shaft 9 located in the axial direction in clutch housing 1 is supported with a ball bearing 28a at the center of flywheel 28. A peripheral portion of PTO clutch front shaft 9 is connected to flywheel 28 through the medium of a damper 54 as a shock absorption element. Therefore, PTO clutch front shaft 9 is rotated substantially in unified form with flywheel 28. Accordingly, PTO clutch front shaft 9 is always rotated as far as engine 5 drives.

Figure 2:
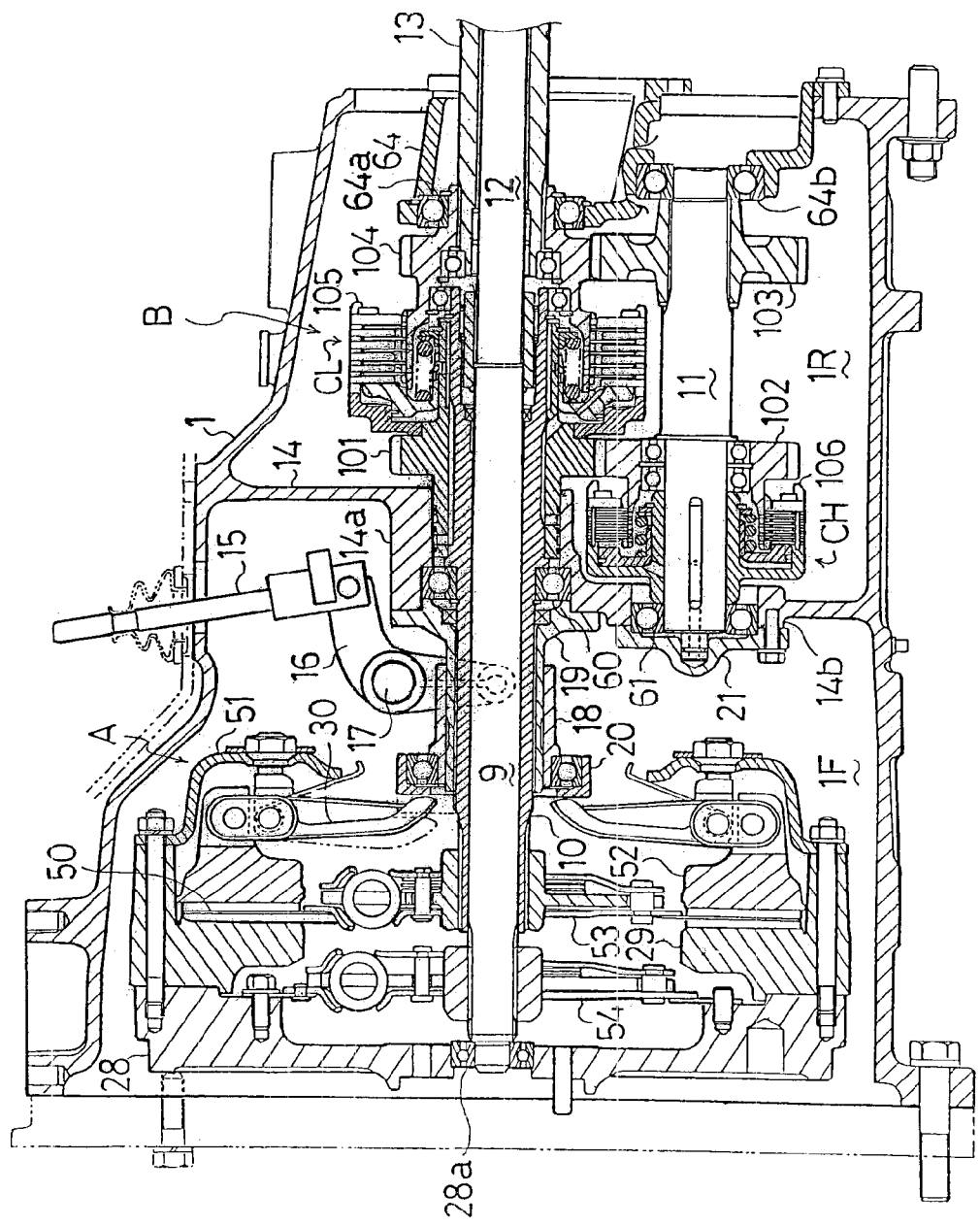
FIG. 2 is a sectional side view of a clutch housing 1 incorporated with a dry type clutch apparatus A and a shift mechanism B.
Figure 3:
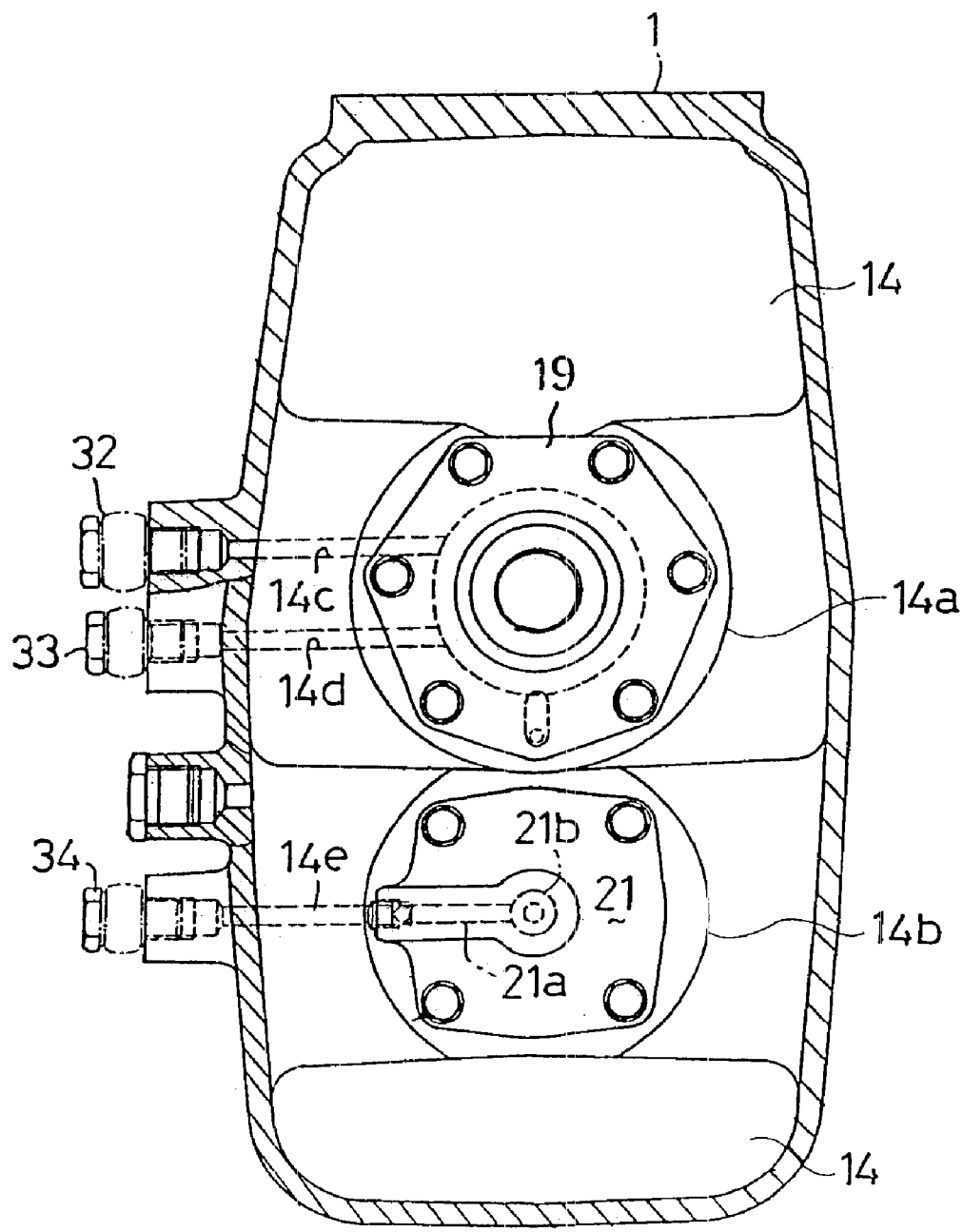
FIG. 3 is a front view in section showing a front structure of a bulkhead 14 of housing 1.
Figure 4:
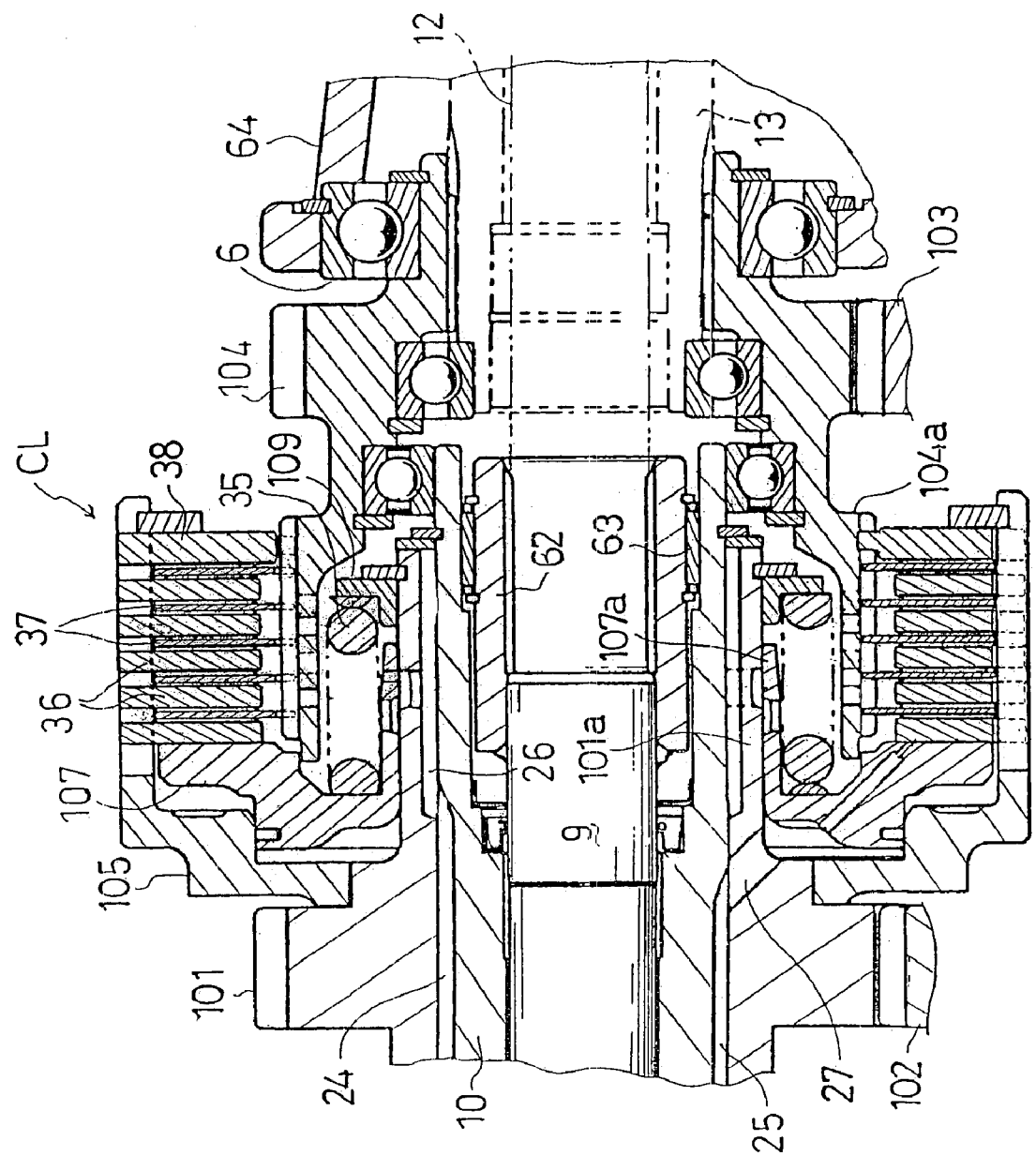
FIG. 4 is a sectional side view of a low-speed hydraulic clutch CL.

In addition, a PTO clutch rear shaft 12 is supported in the axial direction coaxial to PTO clutch front shaft 9 in transmission housing 201. As illustrated in FIGS. 2 to 4, a front end of PTO clutch rear shaft 12 is inserted into rear chamber 1R of clutch housing 1. In rear chamber 1R, a tubiform coupling 62 is fit fixedly into a rear end of a driving clutch shaft 10 through the medium of a needle bearing 63. The rear end of PTO clutch front shaft 9 from forward and the front end of PTO clutch rear shaft 12 from backward are respectively inserted fixedly into coupling 62 so that PTO clutch front shaft 9 is connected to PTO clutch rear shaft 12 in a single bar form.

PTO clutch rear shaft 12 is further extended backward and connected to a PTO shaft, not shown, or connected to a transmission shaft interlocking with the PTO shaft through the medium of a hydraulic or other type PTO clutch in axle housing 202. At the moment when the PTO clutch is engaged so as to integrate PTO clutch front shaft 9 to the PTO shaft, damper 54 delays the rotation of PTO clutch front shaft 9 a little relative to the rotation of flywheel 28. After a while, the rotation speed of PTO clutch front shaft 9 reaches that of flywheel 28. Hence, the shock in engaging of the PTO clutch is damped.

Tubiform driving clutch shaft 10 is attached relatively rotatably around the outer surface of PTO clutch front shaft 9. An intermediate portion of driving clutch shaft 10 passes through a first bearing boss 14a of bulkhead 14 and supported with a ball bearing 60 located in first bearing boss 14a. In front chamber 1F, a front face of ball bearing 60 is covered by a bearing cap 19 attached fixedly to a front face of first bearing boss 14a.

In front chamber 1F is configured dry type single-plate clutch apparatus A (dry type clutch A) as a drag-preventing mechanism of the driving power train. This apparatus will be described. The front portion of bearing cap 19 is formed into a sleeve relatively rotatably fit onto driving clutch shaft 10. A slider 18 supported with a release bearing 20 is attached around the sleeve loosely so that the sleeve together with release bearing 20 can slide freely back and forth on slider 18.

On the other hand, in front chamber 1F are located an intermediate seat 29 fixed to the rear end of flywheel 28, and a single clutch disc 50 which can be pressed against the rear surface of intermediate seat 29. Clutch disc 50 is connected to driving clutch shaft 10 through the medium of a damper 53 as a shock absorption element. Therefore, driving clutch shaft 10 is rotated substantially in a unified form with flywheel 28 through the medium of clutch disc 50 and damper 53.

Dry type clutch apparatus A for preventing a drag may be replaced with a positive clutch such as a jaw clutch, a tooth clutch or a gear clutch. Also, it may be replaced with a dry type multi-plate clutch as a friction clutch, a multi-plate clutch, a cone clutch, a drum clutch, a wrap spring clutch, a centrifugal clutch or the like. A combination of such a clutch with a spring or a shock absorber may be used.

A clutch such as dry type clutch A having clutch disc 50 to be pressed against flywheel 28 is basically used as a main clutch to switch transmission/isolation of engine power to/from the driving power train. In this embodiment, dry type clutch A is also used finally for this purpose as well. However, in this embodiment, as described hereinafter, both shifting hydraulic clutches CL and CH being wet type multi-plate clutches are additionally used as a main clutch. Both clutches CL and CH for shifting are disengaged so as to isolate the driving power train with the transmission of engine power. With regard to inching for avoiding a rapid starting, low-speed hydraulic clutch CL, which has a large volume so as to endure frequent use, is brought into a state of a half clutch. However, even when both hydraulic clutches CL and CH are disengaged, the driving power train downstream from their secondary sides is rotated so as to follow the engine revolution (a drag is generated) due to the viscosity of lubricant oil in hydraulic clutches CL and CH, thereby generating a so-called creep phenomenon.

For the purpose of preventing the creep phenomenon, it may be considerable that a brake is provided on the driving power train in transmission housing 201 and rear axle housing 202. However, in this case, while the driving power train downstream of the secondary side of shift mechanism B in clutch housing 1 can be braked, a portion up to driving clutch shaft 10 is still input with the engine power. Therefore, a corresponding load is put on the engine at idle. This is the reason why the clutch mechanism preventing a drag is provided between flywheel 28 and driving clutch shaft 10. While both hydraulic clutches CL and CH are disengaged, the drag-preventing clutch mechanism is disengaged so as to isolate driving clutch shaft 10 as an input portion of shift mechanism B from flywheel 28 as an engine output portion.

The drag-preventing clutch mechanism, which is disengaged by isolating only driving clutch shaft 10 from flywheel 28, requires less frictional resistance in its switching because driving clutch shaft 10, while being integrated to a gear 105 and a hydraulic clutch casing 105 as discussed later, is almost free from the driving power train downstream of the secondary side of shift mechanism B in transmission housing 201 and rear axle housing 202. Accordingly, for constituting a clutch for preventing a drag (the drag-preventing clutch mechanism), though a variety of configurations may be thought of as described above, simple and compact dry type single-plate clutch apparatus A with low cost is adopted in this embodiment.

In the embodiment, without providing a wet type multi-plate clutch newly as a main clutch, the plurality of wet type multi-plate clutches (hydraulic clutches) used for shifting are used also as a main clutch to isolate a transmission of a engine power from the driving power train. One clutch with a large volume among these wet type clutches is used for generating inching. Therefore, the clutch being pressed against a flywheel, which is essentially used as a main clutch, comes to be used only for preventing a drag so that it may be simple and compact in structure such as a dry type single-plate clutch. Consequently, clutch housing 1 and its inside structure may have a simple and compact configuration. For example, the axial length of clutch housing 1 may be reduced in comparison with a conventional structure using a dry type multi-plate clutch to be pressed against a flywheel as a main clutch.

Figure 12:
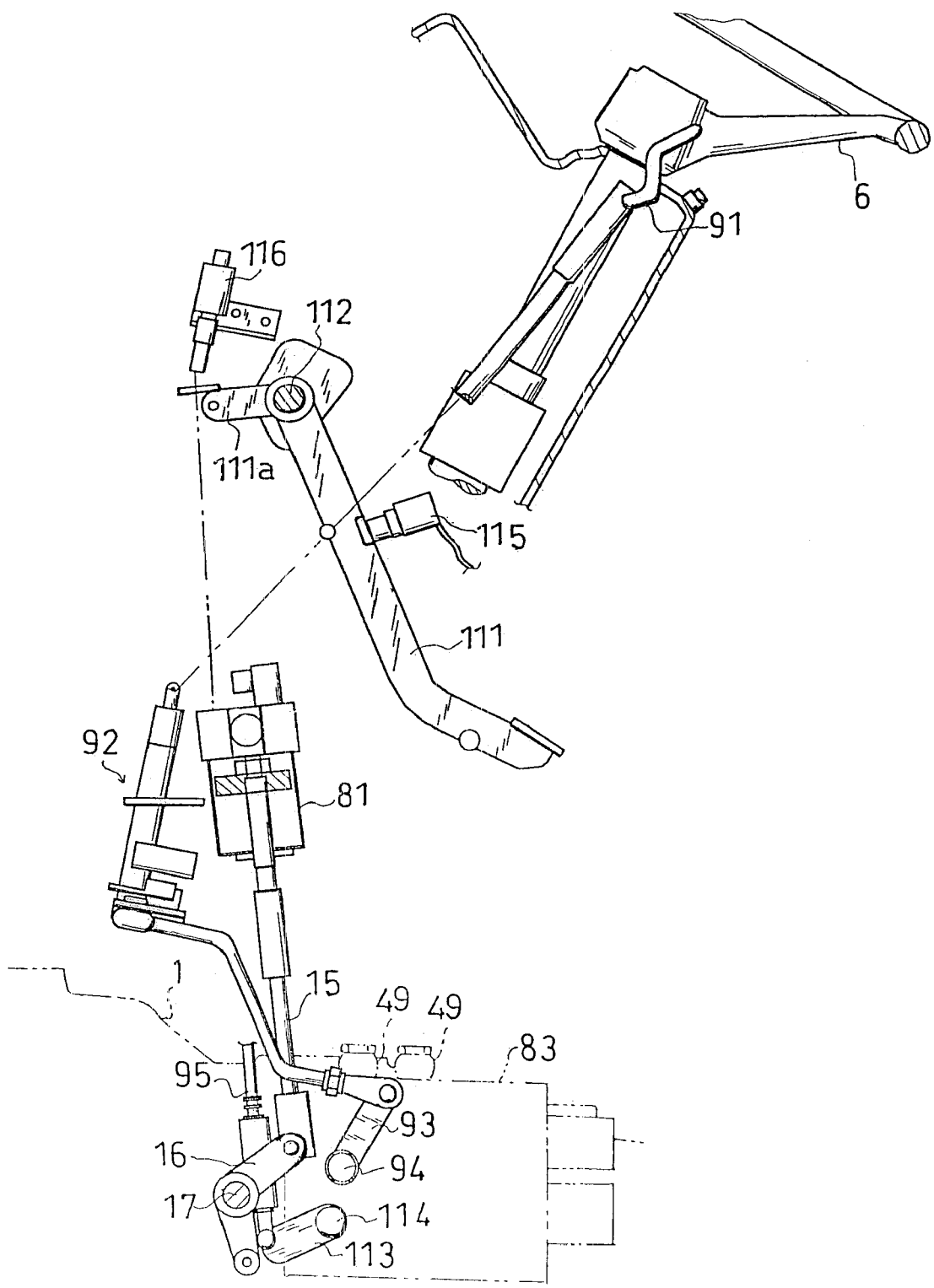
FIG. 12 is a partially sectional side view showing a structure associated with a shift lever 91, a clutch pedal 111, a hydraulic cylinder 81 for operating a dry type clutch, hydraulic pressure control valve apparatus 83 and clutch housing 1.

In a tractor illustrated in FIG. 1, as described later, a clutch pedal 111 as illustrated in FIG. 12 is located below steering wheel 6 so as to serve as means for operating the main clutch. A hydraulic cylinder 81 whose piston rod is extended according as clutch pedal 111 is pressed is located above clutch housing 1. A clutch rod 15 is lengthened approximately downward from the front end of the piston rod of hydraulic cylinder 81 and downwardly inserted into front chamber 1F of clutch housing 1. The bottom end of rod 15 is pivotally coupled to one end of a bell crank 16 provided rotatably around a pivotal shaft 17 in front chamber 1F. The other end of bell crank 16 is pivotally coupled to a slider 18. A plurality of release levers 30 are pivotally supported by a clutch cover 51 integrated with flywheel 28 and intermediate seat 29. The outer end portion of release lever 30 outside of the pivotal portion thereof onto clutch cover 51 is pivotally connected to a pressure plate 52. The inner end portion of release lever 30 is biased by spring force so as to be pressed against release bearing 20.

In such a structure, while clutch pedal 111 illustrated in FIG. 12 is not pressed, the piston rod of hydraulic cylinder 81 is retracted so that release bearing 20 is positioned at the location expressed by a solid line in FIG. 2. Pressure plate 52 presses clutch disc 50 against intermediate seat 29 through being applied with a force forwards by release lever 30. Therefore, clutch disc 50 is rotated in a unified form with flywheel 28 by power of engine 5 so that the engine power is inputted into driving clutch shaft 10 which is rotated substantially in a unified form with clutch disc 50.

When clutch pedal 111 is pressed, the piston rod of hydraulic cylinder 81 is extended downward so as to move clutch rod 15 downward. The end of bell crank 16 coupled to slider 18 is rotated forward so that slider 18 and release bearing 20 are slid forward, whereby the front ends of slider 18 and release bearing 20 is positioned at the location expressed by a phantom line in FIG. 2. Release lever 30 is rotated as indicated by a phantom line and pressure plate 52 is slid backward. Therefore, the pressing of clutch disc 50 against intermediate seat 29 by pressure plate 52 is released, the rotation of flywheel 28 and intermediate seat 29 by the engine power is not transferred to clutch disc 50 and driving clutch shaft 10.

Incidentally, at the moment when dry type clutch apparatus A is engaged (the moment when clutch disc 50 is pressed against intermediate seat 29), the impact in its engaging is damped because the rotation of driving clutch shaft 10 rises to the same speed as that of flywheel 28 and intermediate seat 29 after a time lag by a function of damper 53.

Further, since rotation of the driving train and the PTO train do not change rapidly through function of dampers 53 and 54 while an engine revolution fluctuates rapidly, attrition of parts in each driving train may be avoided. On the contrary, even when rotation of drive wheels 3 or the PTO shaft is lowered rapidly due to load developed therein during driving, the same dampers 53 and 54 prevent that the load is put on the output shaft of engine 5 rapidly so as to hasten the attrition of engine 5.

In rear chamber 1R of the clutch housing 1 is configured shift mechanism B provided in parallel with a low speed power train in which low-speed hydraulic clutch CL is interposed and a high speed power train in which high-speed hydraulic clutch CH is interposed.

At first, the low speed power train is described. As illustrated in FIGS. 2 and 4, a gear 101 is attached fixedly around driving clutch shaft 10 attached relatively rotatably around PTO clutch shaft 9 through the medium of a key. For configuring low-speed hydraulic clutch CL, a hydraulic clutch casing 105 like a drum, which has an open rear end and is formed on its inner periphery with inner splines in the axial direction thereof, is attached fixedly onto gear 101 through the medium of a key.

On the other hand, a tubiform driving power train shaft 13 is attached relatively rotatably around PTO clutch rear shaft 12 posterior to the rear end of driving clutch shaft 10, thereby serving as an input shaft of the driving train shift mechanism located in transmission housing 201. A gear 104 is attached fixedly around driving power train shaft 13 through the medium of spline. Further, a bearing case 64 for covering PTO clutch rear shaft 12 and driving power train shaft 13 is attached fixedly onto the rear end of clutch housing 1 so as to be fit into rear chamber 1R. The rear end of gear 104 is supported by a ball bearing 64a located at the inner periphery of the front end of bearing case 64. When low-speed hydraulic clutch CL is engaged, gear 104 is rotated in a unified form with gear 101 so as to establish a low speed power train with a gear ratio of 1:1.

Low-speed hydraulic clutch CL is described. An inner drum 104a cut with outer splines in the axial direction is integrally extended forward from gear 104 and inserted into clutch casing 105. In a space between clutch casing 105 and inner drum 104a, a plurality of outer plates 36 are fit with inner splines of clutch casing 105 so as to slide back and forth, and a plurality of inner plates 37 are fit with outer splines the inner drum 104a so as to slide back and forth. Outer plates 36 and inner plates 37 are arranged alternately in the axial direction. At the tail end of the space, a fixed plate 38 is attached to clutch casing 105 and/or inner drum 101a so as to be immovable backward.

Furthermore, a boss 101a, which extends integrally from gear 101 backward along driving clutch shaft 10, and an actuator 107 are located in hydraulic casing 105. Actuator 107 is provided at its central portion with a boss 107a, which is attached around boss 101a so as to slide back and forth. A working portion of actuator 107 is interposed so as to slide back and forth between either outer plate 36 or inner plate 37 positioned at the front end (outer plate 36 in this embodiment) and a front face of hydraulic clutch casing 105. In inner drum 104a, an extension spring 35 is interposed between a spring receiver 109 attached fixedly around boss 101a near a rear end of boss 101a and actuator 107, thereby biasing actuator 107 forward. In this regard, while being free in hydraulic pressure, adjacent outer plate 36 and inner plate 37 are separated apart from each other so that hydraulic clutch CL is disengaged. Thus, low-speed hydraulic clutch CL as a wet type multi-plate clutch is constituted on driving clutch shaft 10.

An inside of hydraulic clutch casing 105 is isolated back and forth by actuator 107. When an operation of engaging clutch CL, pressurized oil is supplied to an oil chamber ahead of to actuator 107 so that actuator 107 is slid backward against the force of spring 35 so as to press each outer plate 36 against each inner plate 37.

A high speed power train of shift mechanism B is described referring to FIG. 2 and the like. Also in rear chamber 1R, as illustrated in FIG. 2, a counter shaft 11 is provided in parallel to driving clutch shaft 10. A front end of counter shaft 11 is received with a ball bearing 61 fit into a second bearing boss 14b of bulkhead 14. A rear end of counter shaft 11 is supported with a ball bearing 64b fit into a front end of bearing casing 64 attached fixedly to a rear wall of clutch housing 1 and projects forward. In addition, a front face of ball bearing 61, as illustrated in FIGS. 2 and 3, is covered with a bearing cap 21 attached fixedly to a front face of second bearing boss 14b in front chamber 1F.

A clutch gear 102 always meshed with gear 101 on driving clutch shaft 10 is attached relatively rotatably on counter shaft 11 through the medium of a ball bearing. A gear 103 always meshed with gear 104 fixed on driving power train shaft 13 is attached fixedly around counter shaft 11. Gears 101, 102, 103 and 104 of the high speed power train establish a gear ratio less than the foregoing gear ratio of the low speed power train.

On counter shaft 11 is configured high-speed hydraulic clutch CH for connection and disconnection between clutch gear 102 and counter shaft 11. This is described referring to FIGS. 2 and 5. A hydraulic clutch casing 106 like a drum, which has an open rear end and is provided on its inner periphery with inner splines in the axial direction, is integrally formed at its center portion with a boss 106a. Boss 106a is attached fixedly around counter shaft 11 through the medium of a key so that hydraulic clutch casing 106 is provided in a unified form around counter shaft 11. Just posterior to boss 106a, clutch gear 102 is attached relatively rotatably around counter shaft 11. Clutch gear 102 is integrally formed at its front portion with an inner drum 102a cut with outer splines. Inner drum 102a is inserted into hydraulic clutch casing 106.

In a space between a drum portion of hydraulic clutch casing 106 and inner drum 102a, a plurality of outer plates 66 are fit with an inner splines of hydraulic clutch casing 106 so as to slide back and forth, and a plurality of inner plates 67 are fit with outer splines of inner drum 102a so as to slide back and forth. Outer plates 66 and inner plates 67 are arranged alternately in the axial direction. Further, at the tail end of the space, a fixed outer plate 68 is attached to hydraulic clutch casing 106 so as to be immovable backward.

Furthermore, a spring receiver 110 is attached fixedly around boss 106a of hydraulic clutch casing 106 near a rear end of boss 106a. An actuator 108 is provided at its central portion with a boss 108a, which is attached around boss 106a so as to slide back and forth. A working portion of actuator 108 is interposed so as to slide back and forth between a front face of hydraulic clutch casing 106 and either outer plate 66 or inner plate 67 positioned at the front end. Further, an extension spring 65 is interposed between spring receiver 110 and actuator 108 so as to bias actuator 108 forward. In this regard, while being free in hydraulic pressure, adjacent outer plate 66 and inner plate 67 are separated apart from each other so as to disengage clutch CH.

An inside of hydraulic clutch casing 106 is isolated back and forth by actuator 108. When an operation of engaging clutch CH, pressurized oil is drained from an oil chamber posterior to actuator 108 and supplied to an oil chamber ahead of actuator 108 so as to slide actuator 108 backward against the force of spring 65, thereby pressing each outer plate 66 against each inner plate 67.

Incidentally, in FIGS. 2 and 5, for convenient illustration, a cross section of actuator 108 drawn above counter shaft 11 indicates a position of clutch off (disengaged) and that below counter shaft 11 indicates a position of clutch on (engaged).

Between both shifting hydraulic clutches CL and CH, low-speed hydraulic clutch CL, which can establish a state of half clutch to be also used as a clutch for inching as described later, has a larger volume than that of high-speed hydraulic clutch CH, thereby enduring frequent engaging/disengaging.

If an idle gear is interposed between gears 103 and 104 or between gears 101 and 102, the rotation of driving power train shaft 13, when receiving power through hydraulic clutch CH, is reversed relative to that when receiving power through hydraulic clutch CL, that is, a reversor mechanism is constituted by hydraulic clutches CL and CH. However, both shifting hydraulic clutches CL and CH, in this embodiment, are used insistently for speed-changing so that the rotational direction of driving power train shaft 13 is constant whichever hydraulic clutch CL or CH in shift mechanism B is engaged.

Each of actuators 107 and 108 of respective shifting hydraulic clutches CL and CH is biased so as to disengage the clutch and actuates to engage it when being supplied with oil discharged from a hydraulic pump against the biasing force. Alternatively, each clutch CL or CH may be configured in such a way that it is engaged by the biasing force and is disengaged when hydraulic oil is supplied against the biasing force. In the embodiment, clutches CL and CH will be description as follows on the assumption that they are engaged when hydraulic oil is supplied.

Assuming that clutch pedal 111 shown in FIG. 12 is not pressed and dry type clutch apparatus A is engaged, when a shift lever 91 provided as means for switching between two speed stages of high/low of shift mechanism B, illustrated in FIG. 12, is positioned at its low speed position, the hydraulic oil chamber of low-speed hydraulic clutch CL is supplied therein with pressurized oil, thereby engaging hydraulic clutch CL. Simultaneously, pressurized oil is drained from the hydraulic oil chamber of high-speed hydraulic clutch CH so as to disengage hydraulic clutch CH. In this state, the driving force from a engine 5 is transmitted from driving clutch shaft 10, through gear 101, low-speed hydraulic clutch CL and gear 104, to driving power train shaft 13. In addition, gear 102 is rotated in association with rotation of gear 101, however, counter shaft 11 is not rotated because high-speed hydraulic clutch CH is disengaged.

Also in the state that clutch pedal 111 is not pressed, when shift lever 91 is positioned at its high speed position, the hydraulic chamber of high-speed hydraulic clutch CH is supplied therein with pressurized oil, thereby engaging hydraulic clutch CH. Simultaneously, pressurized oil is drained from the hydraulic oil chamber of low-speed hydraulic clutch CH, thereby disengaging hydraulic clutch CL. Therefore, the driving force from engine 5 is transmitted from driving clutch shaft 10, through gear 101, gear 102 and high-speed hydraulic clutch CH, to counter shaft 11. Gear 103 is rotated in association with rotation of counter shaft 11. Gear 104, which is free from gear 101 because of the disengagement of hydraulic clutch CL, is rotated together with gear 103, thereby rotating driving power train shaft 13. Even when revolution speeds of driving clutch shaft 10 are similar, the gear ratio established by the high speed power train of the combination of gears 101, 102, 103 and 104 is smaller than the gear ratio by gears 101 and 104 in engaging of low-speed hydraulic clutch CL so that revolution speed of gear 104 is faster than that in engaging of hydraulic clutch CL. Consequently, the rotation of driving power train shaft 13 is faster than that in engaging of hydraulic clutch CL, thereby setting the driving speed of a tractor to high-speed stage.

As described above, three clutches in total, that is, dry type clutch apparatus A having clutch disc 50 to be pressed against flywheel 28 and two hydraulic clutches CL and CH in shift mechanism B of two stages of high speed and low speed are located in clutch housing 1. Dry type clutch apparatus A among these clutches is basically used as a main clutch to engage/disengage the transmission of engine power with/from the driving power train. However, it is desirable to pass a state of inching, that is, a state of a half clutch during a transition period between the state in which the transmission of engine power to the driving power train is performed usually (the state of main clutch engaging) and the state in which the transmission of engine power to the driving power train is isolated (the state of main clutch disengaging). In this regard, dry type clutch apparatus A being a dry type single-plate clutch is insufficient with its durability to be used alone for establishing the half clutch because excessive friction load is put on its clutch disc 50.

Then, in this embodiment, as referred to in a description of a hydraulic circuit in a hydraulic pressure control valve apparatus 83 hereafter, both wet type multi-plate hydraulic clutches CL and CH for shifting are disengaged so as to isolate the transmission of engine power to the driving power train (the driving power train located in transmission housing 201 and rear axle housing 202). Furthermore, during the transition period between the clutch disengaging and the clutch engaging, whether a shift lever 91 is positioned at a low speed position or a high speed position, a later-discussed oil path switching valve 44 and the like are used so as to bring low-speed hydraulic clutch CL with a large volume into the state of half clutch, that is, hydraulic clutch CL is used as a clutch for inching, thereby establishing the inching.

Thinking alternately, if dry type clutch apparatus A is not provided, driving clutch shaft 10 remains to be rotated so as to follow the output shaft of engine 5 when both hydraulic clutches CL and CH are disengaged. On the other hand, in each of hydraulic clutches CL and CH both being disengaged, there is generated a little power transmission (creep phenomenon) due to the viscosity of lubricant oil. Consequently, the transmission of engine power to the driving power train is not isolated completely so that the engine at idle is undesirably stressed and damaged with its durability because a carbon deposit caused by incomplete combustion is accumulated in an engine cylinder thereof. It is possible also to say that, for the purpose of dissolving such a problem, there is provided dry type clutch apparatus A isolating driving clutch shaft 10 from the engine output shaft so as to stop rotation of driving clutch shaft 10, thereby removing a creep phenomenon.

In any way, a drag-preventing clutch apparatus to be pressed against flywheel 28 may have a simple and compact structure such as dry type single-plate clutch apparatus A because both hydraulic clutches CL and CH of shift mechanism B are used as a clutch for engagement/disengagement of the driving power train with/from the engine output portion. Further, since only low-speed hydraulic clutch CL between both hydraulic clutches CL and CH is used to generate inching by being brought to a state of a half clutch, high-speed hydraulic clutch CH may have a small volume and a compact size while only low-speed hydraulic clutch CL having a large volume. From the matter described above, inner and outer structures of clutch housing 1 provided therein with these three clutches become compact and simple.

Description will be given on a structure supplying pressurized oil to shifting hydraulic clutches CL and CH, which is configured in clutch housing 1.

As illustrated in FIG. 3, a lube oil passage 14c for the low-speed clutch and a hydraulic oil passage 14d for the low-speed clutch are bored in first bearing boss 14a formed by bulkhead 14 of clutch housing 1. A hydraulic oil passage 14e for the high-speed clutch is bored in second bearing boss 14b formed by bulkhead 14 of clutch housing 1. Pipe fittings 32, 33 and 34 are externally attached to the outward directed openings of respective passages and hydraulic pressure pipes extended from a hydraulic pressure control valve apparatus 83 to be described later are connected to the respective pipe fittings.

As illustrated in FIGS. 2 and 4, in first bearing boss 14a, annular grooves corresponding to oil passages 14c and 14d respectively are cut around a sleeve portion integrated to a front portion of gear 101. On the other hand, in gear 101, oil passage grooves 24 and 24 are cut on driving clutch shaft 10 and each annular groove of gear 101 is communicated with each of oil passage grooves 24 and 25 through a through hole.

Oil passage grooves 24 is communicated with the inner oil chamber posterior to actuator 107 in hydraulic clutch casing 105 through oil passage groove 26 cut on the inner peripheral surface of the rear side of a gear 101. Thus, clutch plates 36, 37, 38 and the like are lubricated by pressurized oil flown into the oil chamber posterior to actuator 107 in hydraulic clutch casing 105 through pipe fitting 32, oil passage 14c and oil passage grooves 24 and 26.

On the other hand, oil passage groove 25 is communicated with the hydraulic oil chamber ahead of actuator 107 in hydraulic clutch casing 105 through an hydraulic oil hole 27 bored in gear 101. When pressurized oil flows through pipe fitting 33, oil passage 14d, oil passage groove 25 and hydraulic oil hole 27 into the hydraulic oil chamber, actuator 107 is slid backward to engage hydraulic clutch CL.

Figure 5:
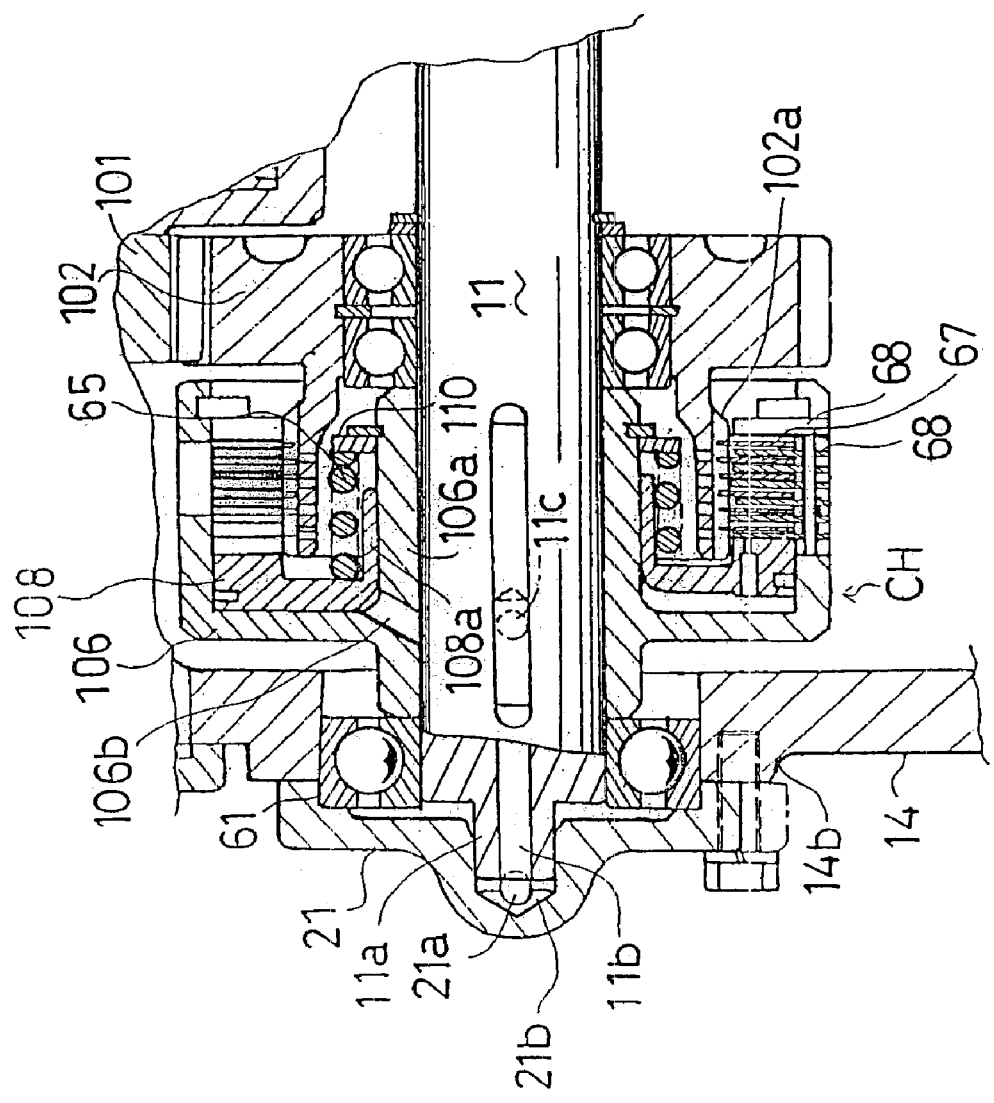
FIG. 5 is a sectional side view of a high-speed hydraulic clutch CH.

As illustrated in FIGS. 2, 3 and 5, pressurized oil for high-speed hydraulic clutch CH flows through pipe fitting 34, oil passage 14e and an oil passage 21a bored within bearing cap 21 into an oil chamber 21b just ahead of a small diameter portion provided in a protruding condition at the tip of counter shaft 11 inside bearing cap 21. Counter shaft 11 is axially bored therein with an oil passage hole 11b, which is open at the front end and extended backward so as to communicate with oil chamber 21b. Counter shaft 11 is also radially bored therein with an oil passage hole 11c extended from the rear end of oil passage hole 11b and opened outward. Further, hydraulic clutch casing 106 is bored therethrough with an oil passage hole 106b, whose inside and outside open ends communicate with an outer open end of oil passage hole 11c and the hydraulic oil chamber ahead of actuator 108 in hydraulic clutch casing 106, respectively. Therefore, pressurized oil supplied into the oil chamber 21b flows further into the hydraulic oil chamber through oil passages 11b and 11c in counter shaft 11 and through-hole 106a so as to make actuator 108 slide backward, thereby engaging hydraulic clutch CH.

The supply/drainage of pressurized oil to both hydraulic clutches CL and CH in shift mechanism B having the above-mentioned configuration, and to a hydraulic cylinder 81 being an actuator for switching dry type clutch apparatus A are controlled by a hydraulic pressure control valve apparatus 83 externally attached to clutch housing 1 as illustrated in FIG. 12 and the like. A hydraulic circuit in hydraulic pressure control valve apparatus 83, referring to FIGS. 6 to 11, and an inner structure thereof, referring to FIGS. 12 and 14 through 18 will be described.

Figure 14:
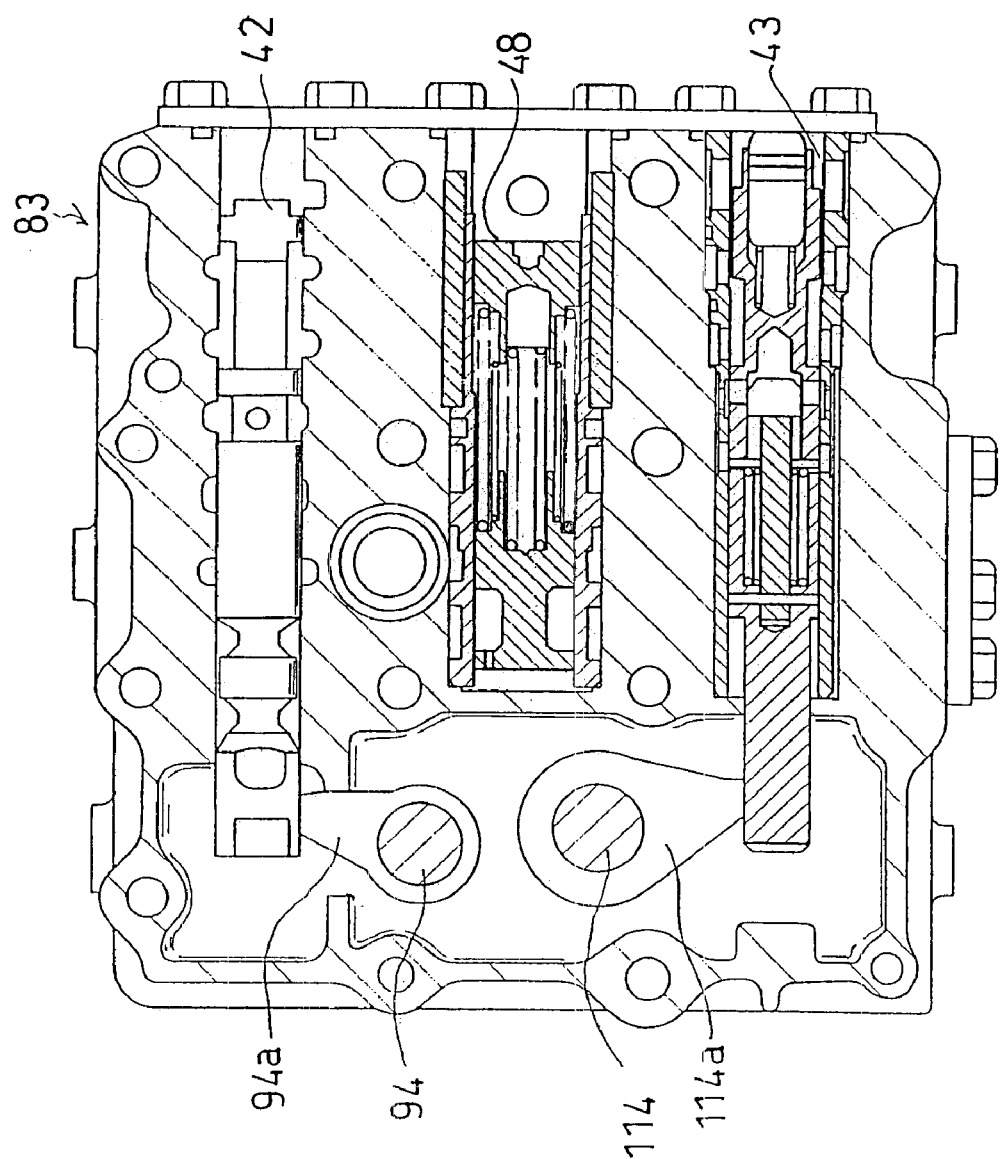
FIG. 14 is a sectional side view of hydraulic pressure control valve apparatus 83.
Figure 15:
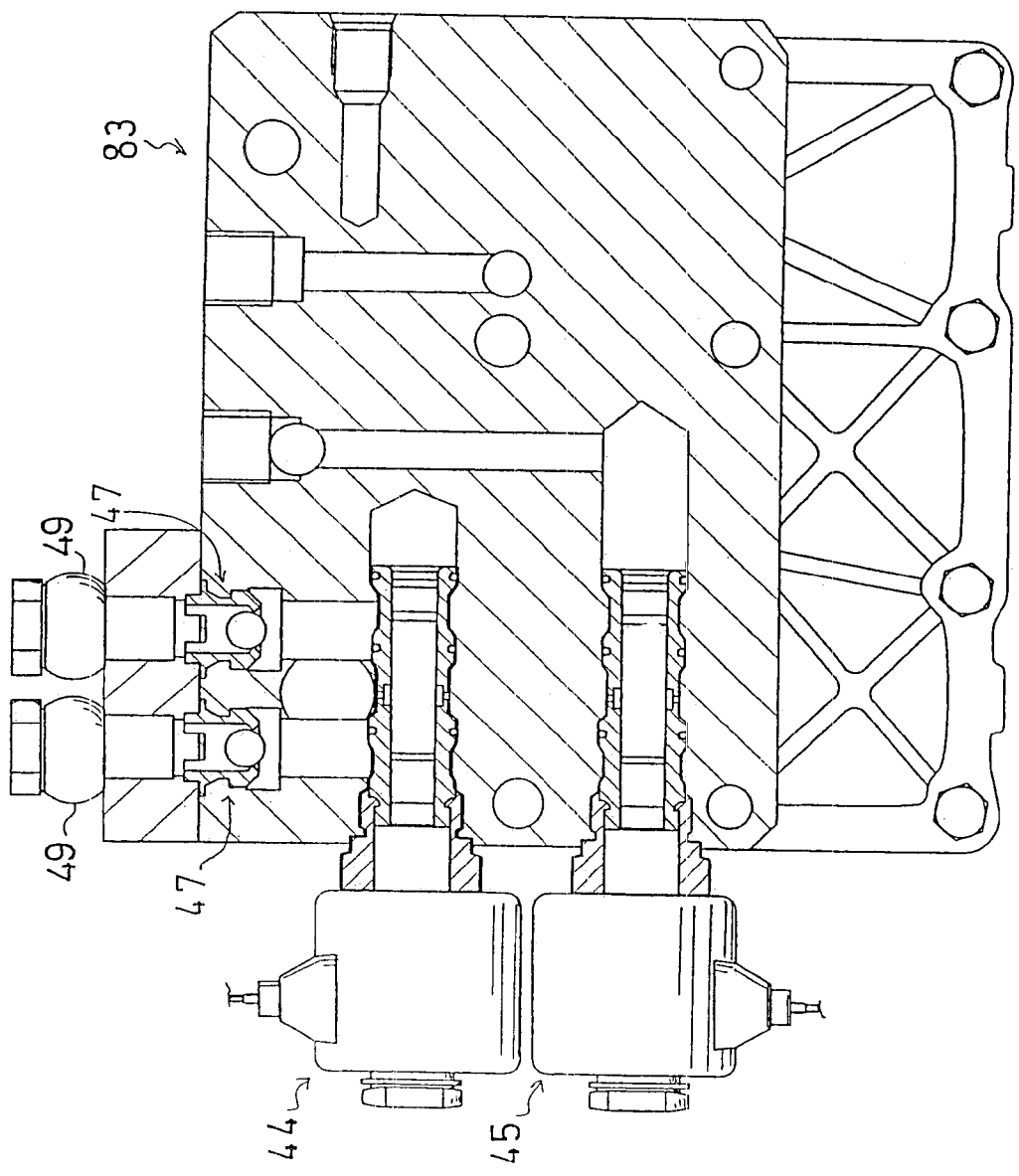
FIG. 15 is a sectional side view of hydraulic pressure control valve apparatus 83 on the opposite side.

Pressurized oil is introduced into hydraulic pressure control valve apparatus 83 from an external hydraulic pump P and broadly distributed among a hydraulic oil circuit for shifting up to high-speed and low-speed hydraulic clutches CH and CL, a hydraulic oil circuit for the dry type clutch up to hydraulic cylinder 81 being an actuator for switching dry type clutch apparatus A, and a lube oil circuit. The hydraulic oil circuit for shifting is provided with a main clutch valve 43, a shift control valve 42, an oil path switching valve 44 and a pair of slow return check valve mechanisms 47 for respective hydraulic clutches CL and CH. The hydraulic oil circuit is provided with a dry type clutch switching valve 45. The lube oil circuit is provided with a delay relief valve (hereafter, referred to as DRV) 48. An arrangement and structure of these respective valves in hydraulic pressure control valve apparatus 83 is as shown in FIGS. 14 and 15. In addition, as illustrated in FIG. 15, in hydraulic pressure control valve apparatus 83, the hydraulic oil circuit for shifting is provided with a pair of outwardly open oil passages including respective slow return check valve mechanisms 47. A pair of pipe fittings 49 are attached to the open ends of these respective oil passages so as to be connected to respective pipe fittings 33 and 34 externally attached onto clutch housing 1 through the medium of pipes.

Pressurized oil introduced into hydraulic pressure control valve apparatus 83 from the hydraulic pump is supplied to main clutch valve 43 of the hydraulic oil circuit for shifting and to dry type clutch switching valve 45 of the hydraulic oil circuit for the dry type clutch under the state that DRV 48 is closed.

At first, the hydraulic oil circuit for shifting is described. Main clutch valve 43 is switched among three positions, that is, a clutch-on position for supplying pressurized oil directly to shift control valve 42, a half-clutch position for supplying pressurized oil to shift control valve 42 through a throttle, and a clutch-off position for cutting off a supply of pressurized oil to shift control valve 42 and draining pressurized oil from shift control valve 42. When main clutch valve 43 is switched to the clutch-off position, both hydraulic clutches CL and CH, after all, are disengaged because pressurized oil is drained from either hydraulic clutch CL or CH which has been supplied with the pressurized oil during its clutch-on.

Figure 13:
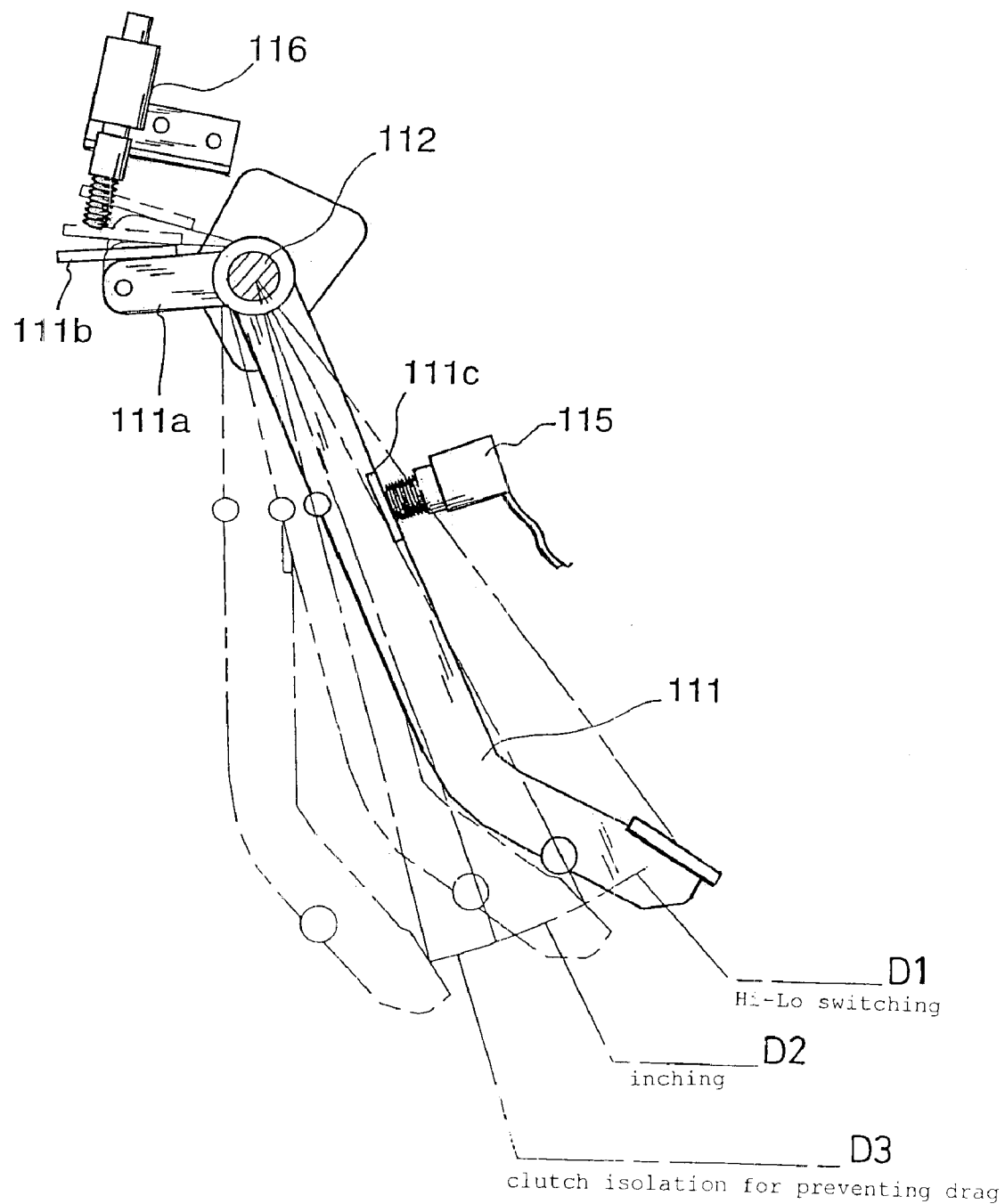
FIG. 13 is a side view showing a structure of switches for the detection of clutch pedal 111 and a position thereof.

Main clutch valve 43 interlocks with clutch pedal 111 through a linkage (the linkage will be detailed later) illustrated in FIG. 12 and the like. Through the medium of the linkage, main clutch valve 43, as illustrated in FIG. 13, is set at the clutch-on position when clutch pedal 111 being unpressed or little pressed so as to remain in a stroke range D1, at the half-clutch position when clutch pedal 111 being pressed to a stroke range D2, and at the clutch-off position when clutch pedal 111 being pressed to the stroke range D3.

Shift control valve 42 is switched between two positions, that is, a low-speed position Lo for supplying pressurized oil to low-speed hydraulic clutch CL and draining pressurized oil from high-speed hydraulic clutch CH and a high-speed position Hi for supplying pressurized oil to high-speed hydraulic clutch CH and draining pressurized oil from low-speed hydraulic clutch CL according to the switching shift lever 91, illustrated in FIG. 12, between its two speed positions of high/low.

Furthermore, shift control valve 42, while being switched between the high/low speed positions, passes through a DRV-actuation position for cutting off an introduction of pressurized oil from the hydraulic pump and bringing an oil passage up to oil path switching valve 44 into connection with a drain port. This position is set to open DRV 48. In association with this, a part of pressurized oil supplied to dry type clutch switching valve 45 is introduced into shift control valve 42. When shift control valve 42 is located at the DRV-actuation position, the oil introduced into shift control valve 42 is drained so as to release a pressure regulating a DRV closure. Further, the pressurized oil introduced from the hydraulic pump is cut off so as to make the oil upstream of main clutch valve 43 flow to DRV 48 so that DRV 48 opens and the hydraulic pressure in an oil inlet port thereof from main clutch valve 43 is reduced. Therefore, when the setting of shift control valve 42 to high-speed position Hi or low-speed position Lo is completed after it passes through the DRV-actuation position, the pressurized oil from the hydraulic pump is not introduced rapidly into shift control valve 42. Then, as DRV 48 closes more and more, the hydraulic pressure of oil into valve 42 from main clutch valve 43 gradually arises. Consequently, the shock developed when either hydraulic clutch CL or CH is engaged in association with shifting between high and low speeds (Hi-Lo) is damped.

Oil path switching valve 44 is an electromagnetic solenoid and may be switched between an energized position and a non-energized position for switching the connection of two ports lead to respective hydraulic clutches CL and CH to two ports lead to shift control valve 42. Oil path switching valve 44 is normally out of an energized state. It is energized so as to supply pressurized oil, which is to be essentially supplied to high-speed hydraulic clutch CH from the point of the position of shift control valve 42, to low-speed hydraulic clutch CL only when clutch pedal 111 is in the stroke range D2 or D3 and simultaneously shift lever 91 is positioned at the high-speed position.

Oil path switching valve 44 is provided to exert pressurized oil for inching (half clutch) only onto low-speed hydraulic clutch CL with a large volume because high-speed hydraulic clutch CH, if being used to be half-clutched during starting or unclutching, is stressed and damaged by a heavy load.

In starting, clutch 111 pressed fully (to stroke range D3) is gradually loosened from a foot force so as to rise through stroke range D2 and finally be released from the foot (so as to reach stroke range D1), thereby engaging a driving clutch. In the case of starting with shaft lever 91 positioned at the low-speed position, oil path switching valve 44 remains non-energized so that pressurized oil is supplied to low-speed hydraulic clutch CL while clutch pedal 111 is in stroke range D2. Even in the case of starting with shift lever 91 positioned at the high-speed position, oil path switching valve 44 is energized so that pressurized oil is still supplied to low-speed hydraulic clutch CL through oil path switching valve 44 while clutch pedal 111 is in stroke range D2.

In the case of pressing of clutch pedal 111 for disengaging the driving clutch, when clutch pedal 111 is pressed to stroke range D2, an oil-supply path of main clutch valve 43 is throttled. If shift lever 91 is in the low-speed position, oil path switching valve 44 remains non-energized so that pressurized oil is still supplied to low-speed hydraulic clutch CL. However, the hydraulic pressure of the supplied oil is reduced because of the throttling of main clutch valve 43. Therefore, actuator 107 of hydraulic clutch CL is gradually moved toward the direction of disengaging the clutch by biasing force of spring 35 so that clutch CL is half-clutched. When clutch pedal 111 is pressed to stroke range D3 finally, the oil path of main clutch valve 43 which is previously used for supplying is changed into one for drainage so that pressurized oil is drained almost completely from the hydraulic oil chamber of hydraulic clutch CL, thereby disengaging both hydraulic clutches CL and CH.

Further, in the case that the driving clutch is disengaged with shift lever 91 positioned at the high-speed position, when clutch pedal 111 is pressed up to stroke range D2, oil path switching valve 44 is energized so as to bring the hydraulic oil chamber of high-speed hydraulic clutch CH into communication with the drain port through oil path switching valve 44 and shift control valve 42 which still remains at high-speed position Hi, thereby draining pressurized oil from the hydraulic oil chamber. On the other hand, main clutch valve 43 is positioned at its half-clutch position so as to throttle its oil-supplying path, which communicates with the hydraulic oil chamber of low-speed hydraulic clutch CL. Therefore, the hydraulic oil chamber of clutch CL is supplied therein with a little oil so that hydraulic clutch CL is half-clutched. When clutch pedal 111 is pressed to stroke range D3 finally, the oil path of main clutch valve 43 which is previously used for supplying oil is changed into one for drainage so that pressurized oil is drained almost completely from the hydraulic oil chamber of hydraulic clutch CL, thereby disengaging both hydraulic clutches CL and CH.

As described above, even though shift lever 91 is positioned at the high-speed position, by switching oil path switching valve 44, pressurized oil is sent to low-speed hydraulic clutch CL with a large volume instead of high-speed hydraulic clutch CH in starting and unclutching. Therefore, during the inching (half-clutching), a relatively excessive load is prevented from being applied on high-speed hydraulic clutch CH, thereby ensuring the durability of hydraulic clutch CH. Alternatively thinking, it is also possible to say that a clutch with a small volume may be used as high-speed hydraulic clutch CH and shift mechanism B in clutch housing 1 may be downsized and simplified because the inching is generated only by low-speed hydraulic clutch CL.

Figure 16:
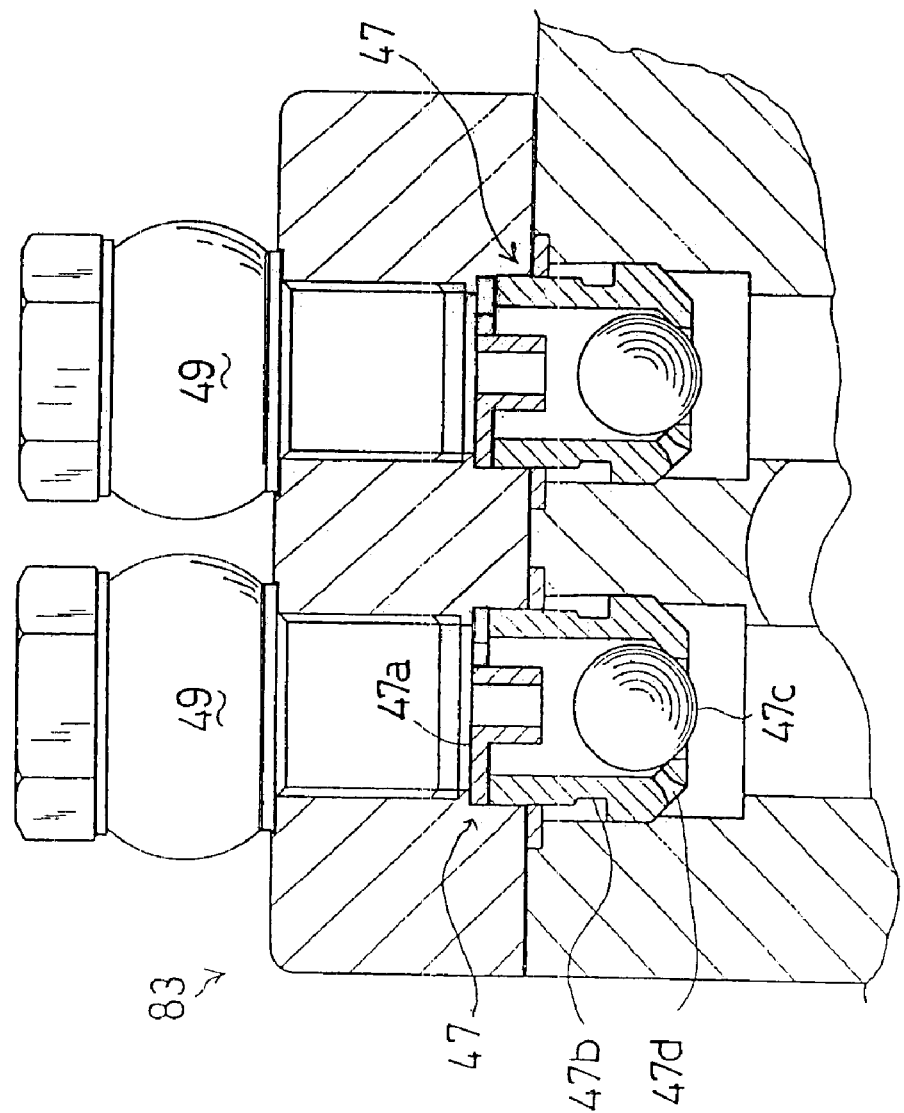
FIG. 16 is a sectional side view of slow return check valves 47 for both hydraulic clutches CL and CH for shifting provided in hydraulic pressure control valve apparatus 83.
Figure 17:
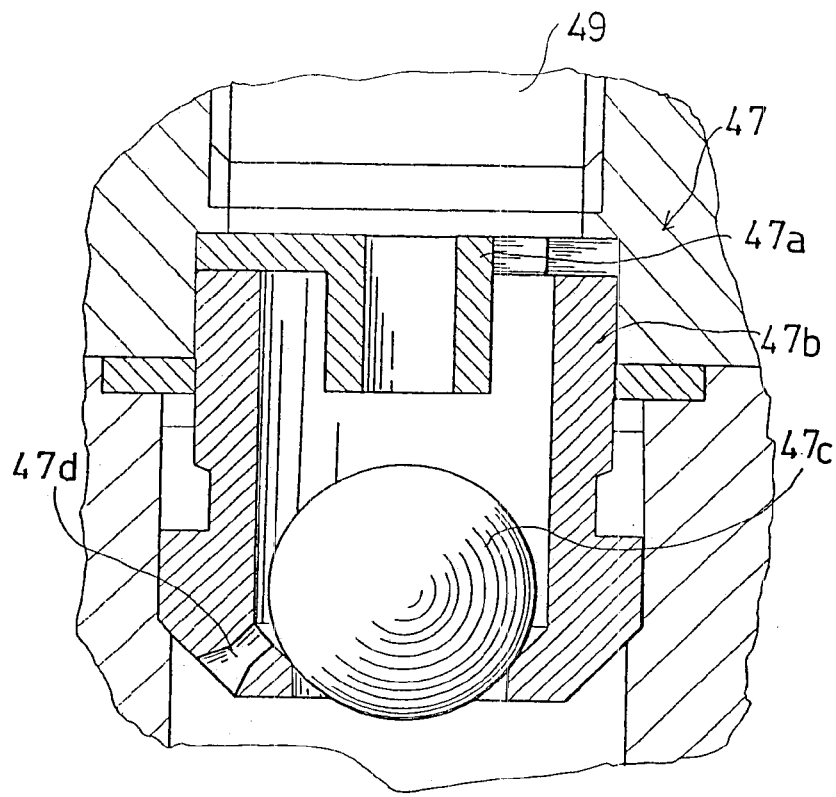
FIG. 17 is a sectional side view of one of slow return check valves 47.
Figure 18:
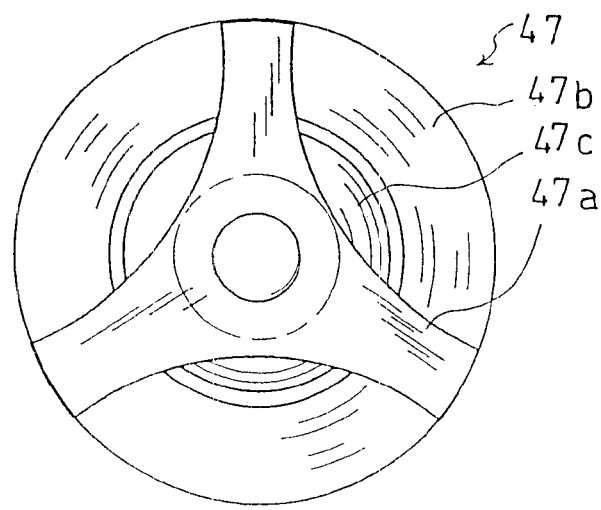
FIG. 18 is a plan view of one of slow return check valves 47.

As illustrated in FIGS. 15 and 16, each of slow return check valve mechanisms 47 is provided in each oil path between oil path switching valve 44 and each of pipe fittings 49 connected to each of hydraulic clutches CL and CH. A structure of each slow return check valve mechanism 47 will be described in details referring to FIGS. 17 and 18.

Each slow return check valve mechanism 47 consists of a ball stopper 47a, a sleeve 47b and a ball 47c. Ball 47c is inserted into sleeve 47b. When being free from hydraulic pressure, ball 47c blocks a bottom hole of sleeve 47b so as to cut the communication with a lower oil path from oil path switching valve 44. When pressurized oil is discharged from oil path switching valve 44 to the lower oil path, ball 47c is pushed up by the pressure and the inside of sleeve 47b is communicated with the lower oil path.

Ball stopper 47a is vertically tubiform and located above ball 47c in sleeve 47b to regulate an upward displacement of ball 47c. Three extensions equally spaced are provided in the horizontal direction from ball stopper 47a and connected to the top end of sleeve 47b. A pipe fitting 49 above ball stopper 47a and the inside of sleeve 47b are always communicated with one another through an cylindrical opening of ball stopper 47a and clearances between the extensions. When pressurized oil is discharged from oil path switching valve 44, ball 47c is floated so that pressurized oil supplied in sleeve 47b flows out toward pipe fitting 49 so as to be supplied to hydraulic clutch CL or CH. On the contrary, pressurized oil from hydraulic clutch CL or CH flows into sleeve 47b through pipe fitting 49.

Furthermore, sleeve 47b is bored in the vicinity of its bottom hole by an orifice 47d which communicates the inside of sleeve 47b with the lower oil path regardless-of whether ball 47c blocks the bottom hole of sleeve 47b or not. When pressurized oil flows into sleeve 47b from hydraulic clutch CL or CH, since ball 47c blocks the bottom hole of sleeve 47b so that pressurized oil supplied into sleeve 47b flows to the lower oil path through orifice 47d, the return action of actuator 107 or 108 based on the clutch-off operation of hydraulic clutches CL and CH is performed gradually, thereby relaxing shock due to their clutch-off.

Figure 9:
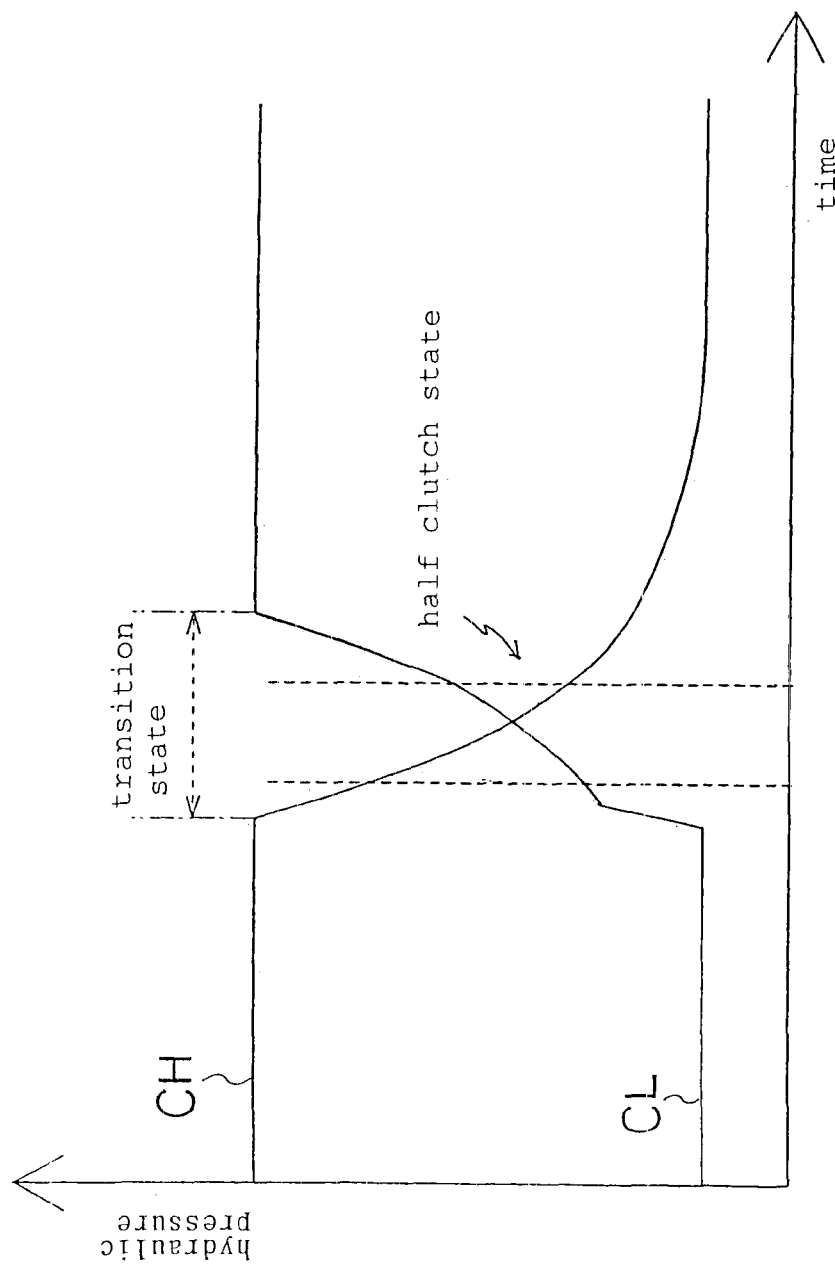
FIG. 9 is a graph showing fluctuations of hydraulic pressure of hydraulic clutches CL and CH for shifting in association with the actuation of a DRV 48 when switching from a high speed stage to a low speed stage using the hydraulic oil circuit illustrated in FIG. 6.

Thus, each of hydraulic clutches CL and CH for shifting is engaged gradually by the effect of DRV 48, and disengaged gradually by the orifice effect of slow return check valve mechanism 47. Therefore, for shifting, for example, from a state of high speed transmission wherein low-speed hydraulic clutch CL is disengaged and high-speed hydraulic clutch CH is engaged to a state of low speed transmission wherein low-speed hydraulic clutch CL is engaged and high-speed hydraulic clutch CH is disengaged, a state in hydraulic pressure control valve apparatus 83 is switched from the state of FIG. 7 to that of FIG. 6 (that is, shift control valve 42 is switched from high speed position Hi to low speed position Lo). During this switching of clutches for shifting, as illustrated in FIG. 9, both clutches CL and CH come to be half-clutched because hydraulic pressure for engaging low-speed hydraulic clutch CL (it corresponds to hydraulic oil pressure supplied to actuate actuator 107 against its biasing pressure) is decreased gradually by the orifice structure of slow return check valve mechanism 47, and pressure for engaging high-speed hydraulic clutch CH (it corresponds to hydraulic oil pressure supplied to actuate actuator 108 against its biasing pressure) is increased gradually by DRV 48. Therefore, there is relaxed shock during shifting speed stages in shift mechanism B with high/low speeds.

Then, a hydraulic oil circuit for the dry type clutch will be described. Dry type clutch switching valve 45 provided in the circuit is made of an electromagnetic solenoid valve which is switched between a clutch-on position for supplying the pressurized oil introduced from the hydraulic pump into hydraulic cylinder 81 as an actuator for dry type clutch apparatus A so as to extend its piston rod and a position for draining the pressurized oil from hydraulic cylinder 81 so as to contract its piston rod.

Ordinarily, dry type clutch switching valve 45 is in the clutch-on position. When clutch pedal 111 is pressed to stroke range D3, valve 45 is switched to the clutch-off position, as illustrated in FIG. 13, so as to disengage dry type clutch apparatus A, thereby cutting off the transmission of engine power to driving clutch shaft 10. Consequently, a creep phenomenon caused from the viscosity of lubricant oil in both hydraulic clutches CL and CH being disengaged, that is, the drag resulting from engine power in the driving power train is prevented.

Figure 6:
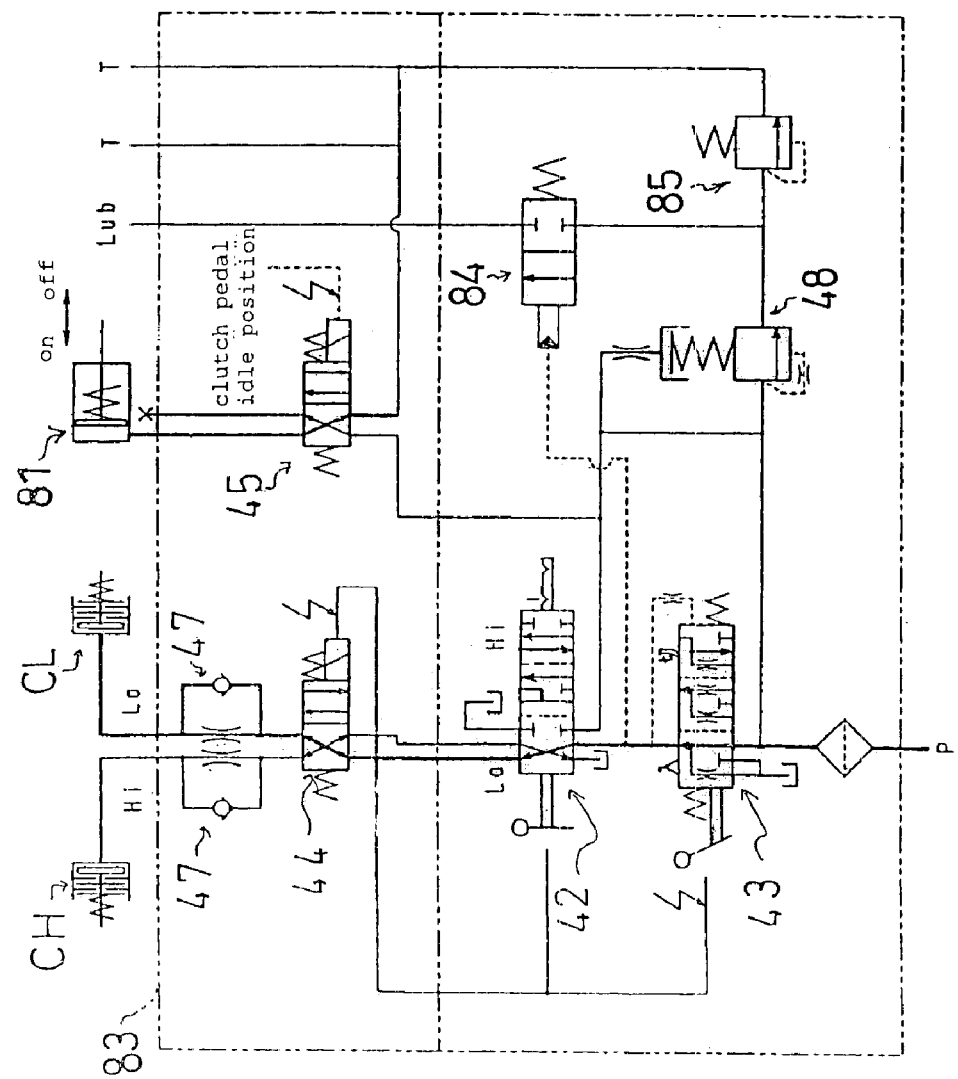
FIG. 6 is a hydraulic oil circuit diagram in a hydraulic pressure control valve apparatus 83 when the shift mechanism is set to a low speed stage in the main clutch engaging.

Further, as illustrated in FIG. 6, in hydraulic pressure control valve apparatus 83, an open/close valve 84 being a hydraulic pressure pilot valve is interposed on the lubricant oil path downstream of DRV 48. Open/close valve 84 is opened when hydraulic pressure in the oil path from main clutch valve 43 to shift control valve 42 becomes higher than the specified pressure. The lubricant oil path is connected through a pipe to pipe fitting 32 provided on clutch housing 1 for supplying lubricant oil. Further, excessive oil to the lubricant oil path is returned to an oil tank T through a relief valve 85. And, pressurized oil drawn from hydraulic cylinder 81 is merged with the oil path to oil tank T so as to be returned to oil tank T.

Figure 7:
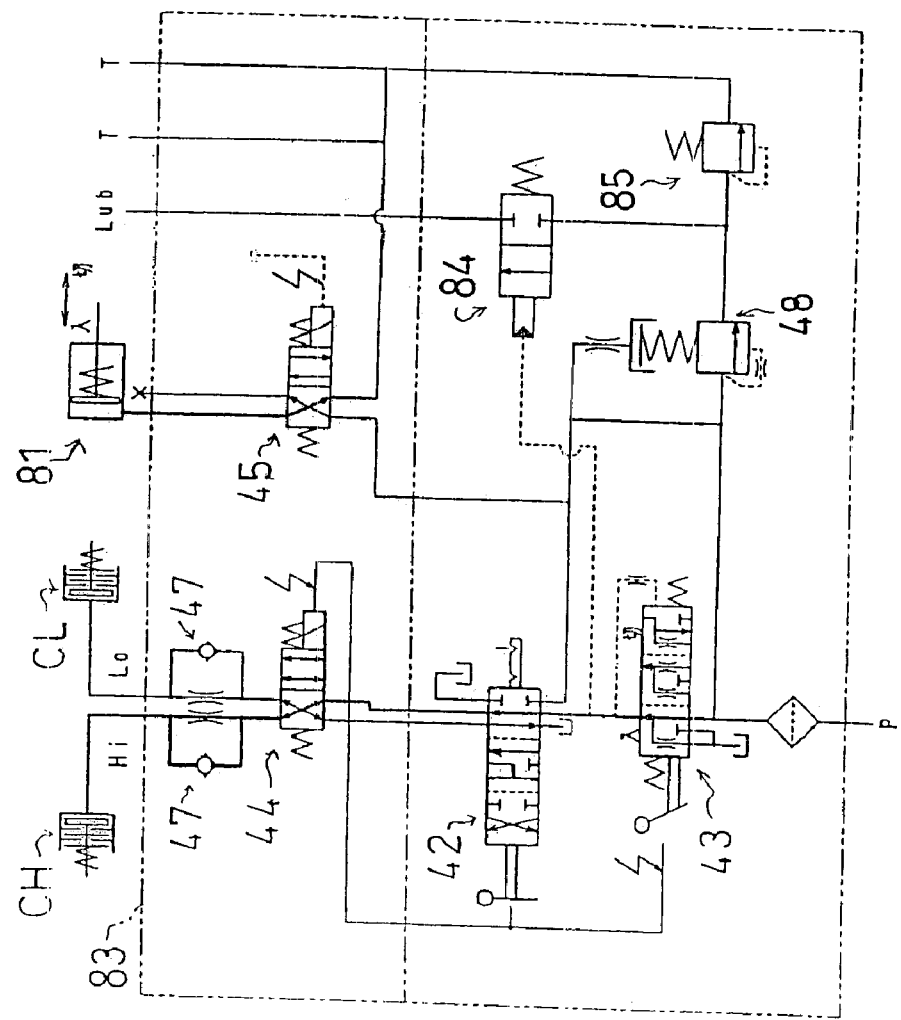
FIG. 7 is a hydraulic oil circuit diagram as well when the shift mechanism is set to a high speed stage in the main clutch engaging.

In such configured hydraulic pressure control valve apparatus 83, when clutch pedal 111 illustrated in FIG. 12 is not pressed at all or almost, that is, clutch pedal 111 is in stroke range DI as illustrated in FIG. 13, main clutch valve 43 is located in its clutch-on position (engaging a clutch), and oil path switching valve 44 and dry type clutch switching valve 45, which are electromagnetic solenoid valves, are out of energized state as illustrated in FIGS. 6 and 7. In such a state, when shift lever 91 illustrated in FIG. 12 is set at its low-speed position, shift control valve 42 linked to lever 91 is set at low-speed position Lo as illustrated in FIG. 6, so that, through oil path switching valve 44 positioned as shown, there is supplied oil into low-speed hydraulic clutch CL for engagement of clutch CL, and is drained oil from high-speed hydraulic clutch CH for disengagement of clutch CH. Therefore, the rotation force of driving clutch shaft 10 is transmitted to driving power train shaft 13 through the medium of low-speed hydraulic clutch CL so as to rotate driving power train shaft 13 at a slow speed.

Also, when shift lever 91 is positioned at the high-speed position under the condition of holding clutch pedal 111 in stroke range D1, shift control valve 42 is set at high-speed position Hi, as illustrated in FIG. 7, so that, through oil path switching valve 44 being positioned at the non-energized position similarly to that in FIG. 6, there is supplied oil to high-speed hydraulic clutch CH for engagement of clutch CH, and drained oil from low-speed hydraulic clutch CL for disengagement of clutch CH. Therefore, the rotation force of driving clutch shaft 10 is transmitted to driving power train shaft 13 through the medium of high-speed hydraulic clutch CH so as to rotate driving power train shaft at a high speed.

Figure 8:
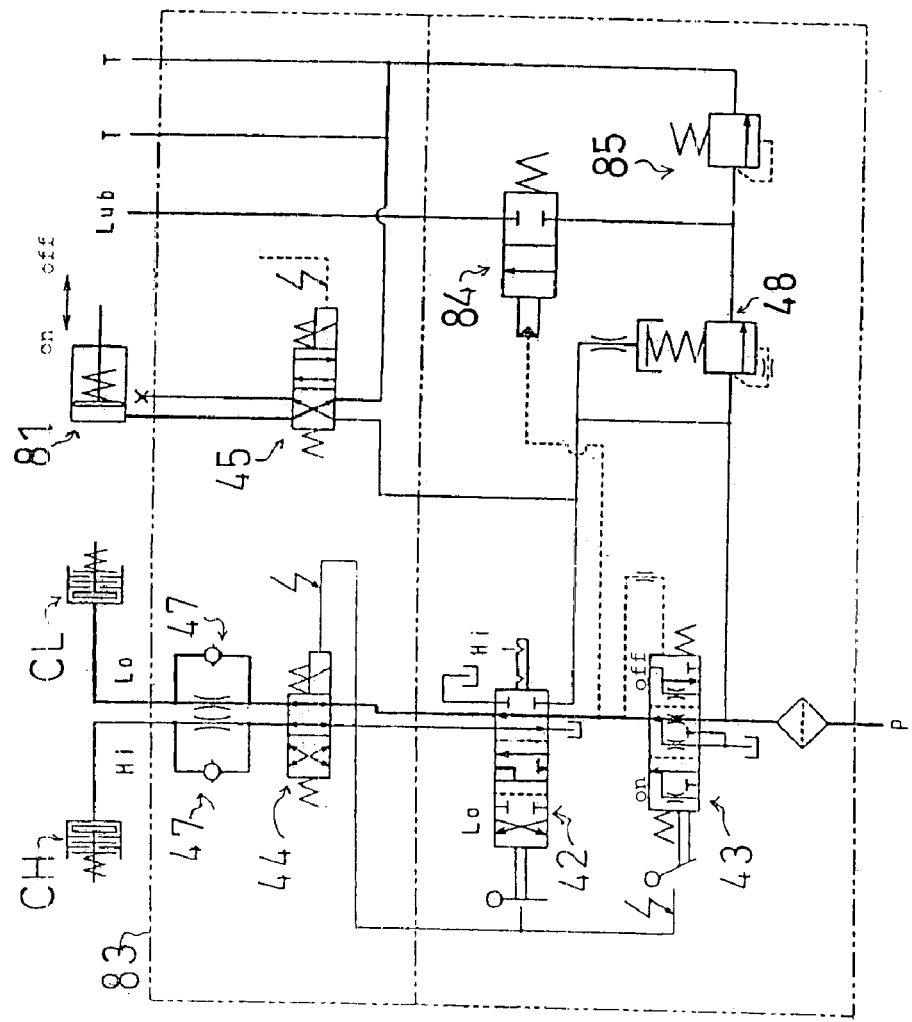
FIG. 8 is a hydraulic oil circuit diagram as well when a main clutch is brought to a state of half-clutch under a high speed setting.

There is shown in FIG. 8 the inside state of hydraulic pressure control valve apparatus 83 when clutch pedal 111, which is loosened from stroke range D3 for starting or is pressed from stroke range D1 for unclutching, comes to stroke range D2 particularly under the condition that shift lever 91 is set at the high-speed position. Main clutch valve 43 is set to be throttled and supply pressurized oil from the hydraulic pump to low-speed hydraulic clutch CL through shift control valve 42 at high-speed position and energized oil path switching valve 44. Hydraulic clutch CL is half-clutched because main clutch 43 is throttled so as to lower the hydraulic pressure of supply oil. On the other hand, high-speed hydraulic clutch CH is disengaged because it communicates with the drain port of shift control valve 42 through oil path switching valve 44 so as to drain oil therefrom. Similarly with the case in shifting, supply of pressurized oil is switched between both hydraulic clutches CL and CH. However, as the above-description of the transition state shown in FIG. 9, shock resulting from the rapid fluctuation of hydraulic pressure does not occur because pressurized oil from high-speed hydraulic clutch CH to be drained passes through orifice 47d of slow return check valve mechanism 47.

Further, in a period of starting with shift lever 91 positioned at the high-speed position, after the state in FIG. 8, clutch pedal 111 is returned to stroke range D1, main clutch valve 43 is positioned to the clutch-on (engaging) position, and simultaneously, oil path switching valve 44 is energized. Therefore, high-speed hydraulic clutch CH is supplied with pressurized oil discharged again from main clutch valve 43, and low-speed hydraulic clutch CL drains pressurized oil therefrom. Incidentally, high-speed hydraulic clutch CH rises to the specified pressure soon because of being small in volume, and the transition of low-speed hydraulic clutch CL is done from its state of half-clutch, so that hydraulic pressure does not fluctuate so rapidly, thereby avoiding shock.

Figure 10:
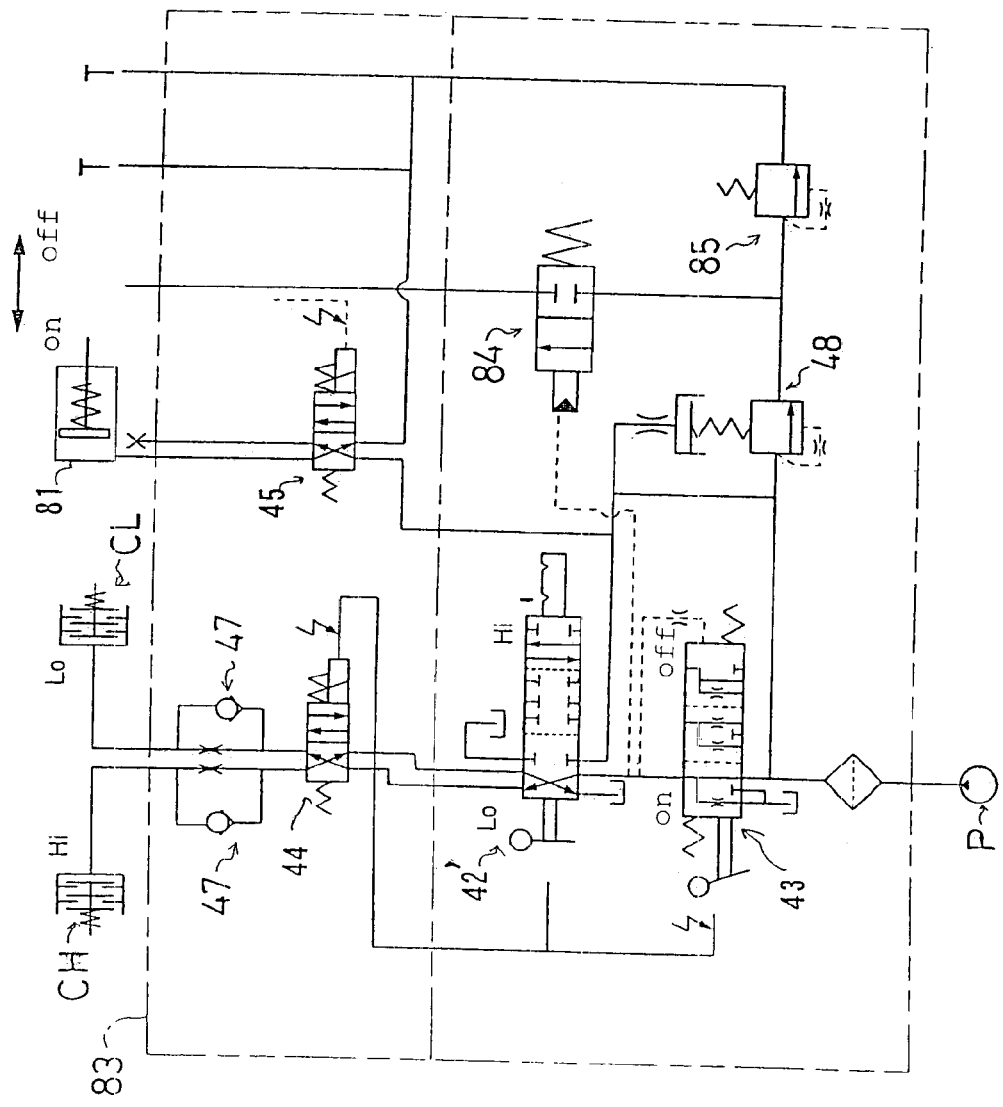
FIG. 10 is a hydraulic oil circuit diagram in a hydraulic pressure control valve apparatus 83 using a shift control valve 42' in place of a shift control valve 42, which does not actuate DRV 48 in shifting.

Alternatively, as shown in FIG. 10, a shift control valve 42' may be provided in place of shift control valve 42. Shift control valve 42 is provided with the DRV-actuation position to open DRV 48 during the transition between high-speed position Hi and low-speed position Lo. However, shift control valve 42' closes all ports during its transition between high and low speed positions so that DRV 48 remains closed.

In the case that shift control valve 42 having the DRV-actuation position is used as the hydraulic oil circuit shown in FIG. 6 and the like, the engaging hydraulic pressure in a hydraulic clutch to be engaged during the transition in shifting, as illustrated in FIG. 9. The engaging hydraulic pressure of a hydraulic clutch to be disengaged (in this case, high-speed hydraulic clutch CH) is reduced gradually to some extent by the effect of slow return check valve mechanism 47. The reduction rate of hydraulic pressure of the clutch to be disengaged is insufficient if it is solely used to establish desirable inching (half-clutching) during a transition period in shifting. However, the rising rate of hydraulic pressure of the hydraulic clutch to be engaged is restricted by the effect of DRV 48 so much as to ensure the inching during the transition. Thus, in the case of the hydraulic oil circuit shown in FIGS. 6, 7 and the like, during the shifting between high and low speed stages (Hi-Lo), the hydraulic clutch to be engaged is limited in its increase rate of hydraulic pressure so as to be half-clutched, thereby relaxing impact in shifting.

Figure 11:
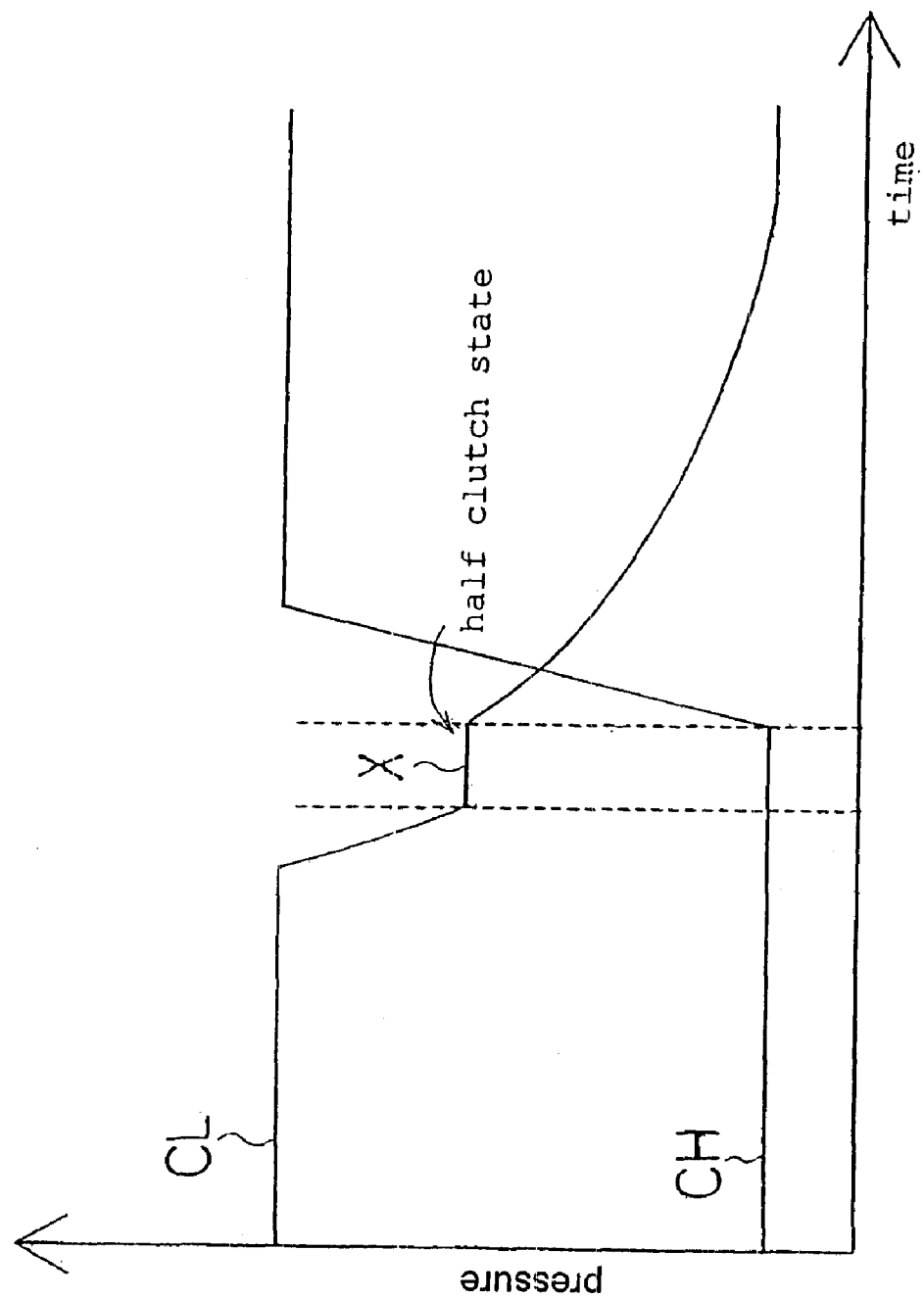
FIG. 11 is a graph showing fluctuations of hydraulic pressure of hydraulic clutches CL and CH for shifting when switching from a high speed stage to a low speed stage using the hydraulic oil circuit illustrated in FIG. 10.

In the hydraulic oil circuit using shift control valve 42' of FIG. 10, for example, in the case of shifting operation to shift from a low speed stage to a high speed stage, engaging pressure of high-speed hydraulic clutch CH, as illustrated in FIG. 11, is increased rapidly after shift control valve 42' is switched to high speed position Hi. However, if shift lever 91 is operated gradually from the low speed stage to the high speed stage, shift control valve 42' stay at the transition position at which all ports is closed for a while. During this time, engaging pressure of low-speed hydraulic clutch CL, which is not subjected to a pump discharge pressure, is decreased a little, reaches a certain pressure, and is kept constant(as a horizontal portion X of a graph CL) so that low-speed hydraulic clutch CL is half-clutched. When shift control valve 42' reaches high speed position Hi, pressurized oil of low-speed hydraulic clutch CL is drained through orifice 47d of slow return check valve mechanism 47 so that its engaging pressure is lowered. As a result, in the hydraulic oil circuit of FIG. 10, by operating shift lever 91 gradually, pressure decrease of a hydraulic clutch to be disengaged is stopped at the level of some extent once so that the clutch is brought to the state of half-clutch, thereby relaxing impact in switching speed stages of high and low.

As described above, each hydraulic pressure valve in hydraulic pressure control valve apparatus 83 controlling dry type clutch apparatus A and hydraulic clutches CL and CH for shifting has a structure linked with clutch pedal 111 and shift lever 91. This structure of operational linkage will be described referring to FIGS. 12 to 15.

As illustrated in FIG. 12, shift lever 91 is located in the vicinity of steering wheel 6. Shift lever 91 is connected to a linkage 92 by a universal joint and the like. Linkage 92 is connected to an arm 93 attached fixedly to a shaft 94 supported pivotally onto hydraulic pressure control valve apparatus 83. As illustrated in FIG. 14, in hydraulic pressure control valve apparatus 83, an arm 94a is fixed onto shaft 94 and connected to shift control valve 42. Therefore, shift control valve 42 is slid and switched with its ports by rotation of shaft 94 according to the switching operation of shift lever 91.

Clutch pedal 111 is located below steering wheel 6, and hydraulic cylinder 81 being an actuator for dry type clutch apparatus A is located below clutch pedal 111. Further, as illustrated in FIG. 15, pipes are extended from oil passages from dry type clutch switching valve 45 in hydraulic pressure control valve apparatus 83 and connected to hydraulic cylinder 81.

A piston rod hydraulic cylinder 81 is connected to a clutch rod 15 projecting upward from clutch housing 1 illustrated in also FIG. 2 and is configured to rotate a bell crank 16 in association with extension and retraction of the piston rod. A mechanical structure of dry type clutch apparatus A from bell crank 16 up to dry type clutch disc 50 through the medium of release lever 30 and the like in clutch housing 1 is as the foregoing description based on FIG. 2. Clutch housing 1 is not required to be enlarged with its inner space for arranging hydraulic cylinder 81 serving as an actuator for dry type clutch apparatus A because cylinder 81 is located outside a clutch housing 1. Hydraulic cylinder 81 is located above clutch housing 1 conveniently for its maintenance and assembly. Additionally, clutch rod 15 may be provided with an adjustment portion at the position above clutch housing 1, thereby enabling the response of dry type clutch apparatus A to the actuation of hydraulic cylinder 81 to be adjusted easily.

Clutch pedal 111 is further, as described above, linked to main clutch valve 43 in hydraulic pressure control valve apparatus 83. Referring to this based on FIG. 12, a base portion of clutch pedal 111 is pivoted around a supporting shaft 112, and an arm 111a is fixed to the base portion so as to be rotated together with clutch pedal 111. A link 95 is connected to an end of arm 111a and connected to an end of an arm 113 fixed to a shaft 114. Shaft 114 is pivoted on hydraulic pressure control valve apparatus 83. In hydraulic pressure control valve apparatus 83, as illustrated in FIG. 14, an arm 114a is fixed to shaft 114 and connected to main clutch valve 43 so that main clutch valve 43 is slid to be switched by the rotation of shaft 114.

As illustrated in FIG. 15, oil path switching valve 44 and dry type clutch switching valve 45 being electromagnetic solenoid valves provided in hydraulic pressure control valve apparatus 83 require for their electromagnetic control that the position of clutch pedal 111 is detected. As means detecting the position, as illustrated in FIG. 13, a flap 111c is attached fixedly to a front end of clutch pedal 111, a flap 111b is attached fixedly to arm 111a unified with clutch pedal 111. Correspondingly, a position detecting switch 115 for controlling oil path switching valve 44 is located so as to be turned on by abutting against flap 111c when clutch pedal 111 remains in stroke range D1, and a position detecting switch 116 for controlling dry type clutch switching valve 45 is located so as to be turned on by abutting against flap 111b when clutch pedal 111 is pressed to stroke range D1.

FIG. 19 is a table including pictorial clutch pedals 111 showing a relation between strokes of clutch pedal 111 and states of on/off of position detecting switches 115 and 116 as described. In this case, though it is defined that each switch of switches 115 and 116 is turned on when being pushed against each of flaps 111c and 111b. Alternately, it may also be defined that each of switches 115 and 116 is turned off when being pushed against each of flaps 111c and 111b (turned on when being not pressed). Essentially, it is well to say that each of electromagnetic solenoids 44 and 45 is out of an energized state when each of switches 115 and 116 is pushed against each of flaps 111c and 111b.

In the state that shift lever 91 is detected to be positioned at the high-speed position by detection means of its position (not shown), oil path switching valve 44 is energized if position detecting switch 115 is turned off (that is, clutch pedal 111 is in stroke range D2 or D3), and is out of an energized state if switch 115 is turned on (that is, clutch pedal 111 is in stroke range D1). Incidentally, when shift lever 91 is positioned at the low-speed position, switching valve 44 is always out of an energized state.

Further, when position detecting switch 116 is turned on, that is, clutch pedal 111 is pressed to stroke range D3, dry type clutch switching valve 45 is energized so as to supply pressurized oil to hydraulic cylinder 81, thereby disengaging dry type clutch apparatus A.

As illustrated in FIG. 13, the full stroke range of clutch pedal 111 is divided into three stroke ranges D1, D2 and D3 depending on the degree of pressing as described hitherto. Stroke range D1 is defined as a range for engaging a main clutch. When pedal 111 being in range D1, an ordinary driving transmission can be established by shift mechanism B wherein hydraulic pressure of one of low-speed and high-speed hydraulic clutches CL and CH is set to the specified pressure and pressurized oil is drained from the other one clutch. Also, the shifting between two speed stages of high and low (Hi-Lo switching) can be performed by exchanging engaging/disengaging between hydraulic clutches CL and CH. Stroke range D2, being defined as a range of inching, corresponds to the operation for generating inching so that low-speed hydraulic clutch CL is supplied with pressurized oil less than the specified pressure so as to be half-clutched. Stroke range D3, being defined as a range for disengaging a main clutch, corresponds to the operation for completely draining pressurized oil from the hydraulic oil chambers of both hydraulic clutches CL and CH and disengaging dry type clutch A (disengaging the drag-protecting clutch apparatus).

Figure 20:
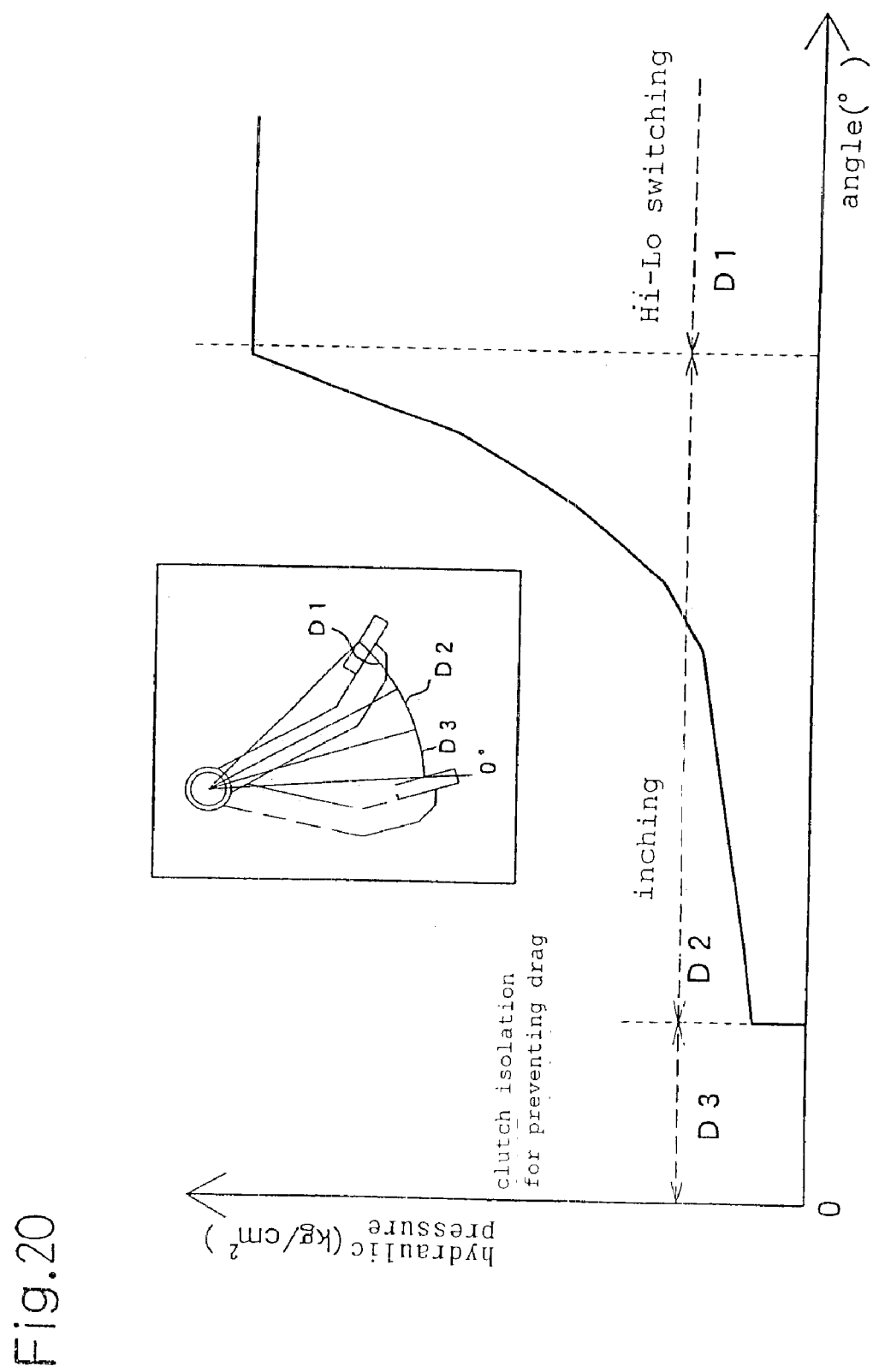
FIG. 20 is a graph indicating a correlation between the engaging hydraulic pressure of low-speed hydraulic clutch CL as a clutch for inching and the rotational angle of clutch pedal 111, wherein a border between an inching range and a main-clutch-on range is set to the rotational angle where the engaging hydraulic pressure reaches a maximum pressure.
Figure 21:
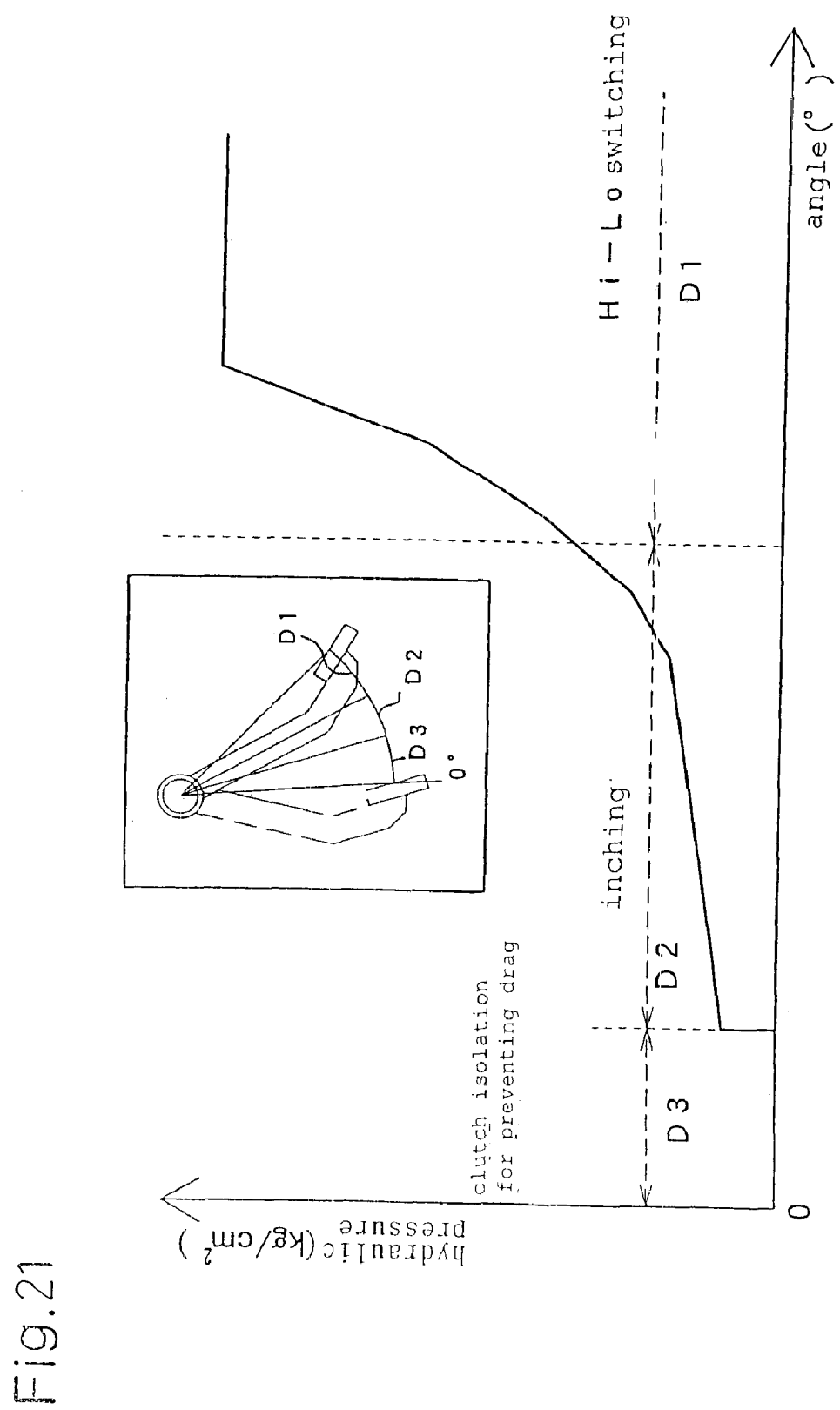
FIG. 21 is a similar graph indicating a correlation, wherein a border between the inching range and the main-clutch-on range is set to the rotational angle where engaging hydraulic pressure is less than the maximum pressure.

It will be considered which pressing angle of clutch pedal 111 corresponds to each of divisions of stroke ranges D1, D2 and D3, based on the graphs of FIGS. 20 and 21. This graph illustrates a correlation between the engaging pressure of low-speed hydraulic clutch CL used as a clutch for inching (hydraulic pressure in its hydraulic oil chamber having the unit of kg/cm2, for example) and the rotational angle (degree) of clutch pedal 111, in which the way how to set stroke ranges D1, D2 and D3 is expressed. The rotational angle of clutch pedal 111, when being fully pressed, is defined as 0o. The angle is increased as pedal 111 is loosened so as to rise. The normal position (position for engaging the main clutch) of clutch pedal 111 to be completely released is set as the maximum angle of its rotation.

The range for play of low-speed hydraulic clutch CL, that is, the range of rotational angle (0Ω−) of clutch pedal 111 till the minimum of hydraulic oil pressure (engaging pressure) rises in the hydraulic oil chamber (the oil chamber ahead of piston 107 in hydraulic clutch casing 102) is defined as stroke range D3. Of course, at this time, actuator 108 of high-speed hydraulic clutch CH also plays, that is, at a state antecedent to a rise of the minimum hydraulic oil pressure thereof. Dry type clutch apparatus A is disengaged at the location of the pedal 111 pressed fully (0Ω in the angle of rotation in FIGS. 20 and 21) and is completely engaged before the rotational angle of clutch pedal 111 is increased to reach the border with stroke range D2. In other words, dry type clutch A enters stroke range D2 while being completely engaged. Therefore, dry type clutch apparatus A is half-clutched on the way from its disengaging state to its engaging state when both wet type clutches CL and CH play, whereby an undue friction is not put on dry type clutch apparatus A in half-clutch operation so as to secure the durability of dry type clutch apparatus A.

When any rotational angle of clutch pedal 111 is set in stroke range D2, the engaging pressure of low-speed hydraulic clutch CL after the minimum thereof rises is determined in correspondence to the set rotational angle of pedal 111 because main clutch valve 43 is a proportional valve which is throttled in correspondence to the rotational angle of pedal 111 as illustrated in foregoing FIG. 14 and the like. The value of engaging pressure is set so as to increase gradually in the first half and rapidly in the latter half as the rotational angle of pedal 111 is increased. In the period of engaging pressure increasing from the minimum hydraulic pressure to the specified pressure, low-speed hydraulic clutch CL is half-clutched so as to generate inching.

The border between stroke ranges D3 and D2 is set to the rotational angle of clutch pedal 111 corresponding to the rise of the minimum engaging pressure of low-speed hydraulic clutch CL as described above. On the other hand, the border between stroke ranges D2 and D1 is set, considering the case that shift lever 91 is positioned at the high-speed position.

In the graph of FIG. 20, pedal 111 comes to the border between stroke ranges D2 and D1 after the engaging pressure of low-speed hydraulic clutch CL reaches a specified pressure (maximum pressure). Accordingly, when starting with shift lever 91 positioned at the high speed-position, pedal 111 enters stroke range D1 from the engaging state of low-speed hydraulic clutch CL so that pressurized oil is drained from low-speed hydraulic clutch CL and supplied to high-speed hydraulic clutch CH, as if the shifting operation from a low speed stage to a high speed stage under the condition of clutch on, and finally, the driving power train is set to the high speed stage. Therefore, low-speed hydraulic clutch CL with the large volume rises up to the specified pressure once, and then, it is half-clutched again due to an exchange of pressurized oil between both hydraulic clutches CL and CH, whereby fluctuations of hydraulic pressure becomes large.

In FIG. 21, the border between stroke ranges D2 and D1 is set at the end point of the first half of engaging pressure increasing period during which the engaging pressure of low-speed hydraulic clutch CL rises to the minimum and increases gradually. In other words, the object to be supplied with pressurized oil from shift control valve 42 is switched to high-speed hydraulic clutch CH before hereafter the engaging pressure of low-speed hydraulic clutch CL rises rapidly up to the specified pressure. When starting, after clutch pedal 111 is shifted from stroke range D2 to stroke range D1, pressurized oil is drained from low-speed hydraulic clutch CL, and simultaneously, supplied to high-speed hydraulic clutch CH. However, fluctuation of hydraulic pressure is little because the pressurized oil supplied to low-speed hydraulic clutch CL at the time of this shift of stroke is less. Therefore, transition from the state of half-clutch to the state that high-speed hydraulic clutch CH is engaged is smooth. However, in valve setting like FIG. 21, a load on high-speed hydraulic clutch CH is more than that in FIG. 20 when starting with shift lever 91 positioned at the high-speed position. With regard to the setting to be selected from FIGS. 20 and 21, it is better to select the suitable one considering a valve structure and the like.

Alternatively, hydraulic clutches CL and CH may be exchanged with ones which is engaged by biasing force and disengaged by being supplied with hydraulic pressure oil against the biasing force, contrary to the embodiment. In this case, engaging pressure of a hydraulic clutch corresponds to the biasing pressure against hydraulic oil pressure supplied thereto. Therefore, as the supplied hydraulic oil pressure increases, the engaging pressure of the clutch decrease. When using such configured hydraulic clutches for shifting, the above-mentioned shifting hydraulic oil circuit in hydraulic pressure control valve apparatus 83 is still applicable while the arrangement of valves such as main clutch valve 43, shift control valve 42, oil path switching valve 44, slow return check valve 47 and the like is not changed basically but the inlet port and the outlet port of each valve is exchanged with each other.

As described above, though the embodiment has been described using two hydraulic clutches as a sub-shift of two stages of high/low, the structure of a vehicle power train in accordance with the invention is applicable for a case using three or more hydraulic clutches to generate a shift with three or more stages. That is, it is preferred that any clutch with a large volume suitable for generating inching is selected among the plurality of hydraulic clutches so as to serve as a hydraulic clutch to be half-clutched during engaging/disengaging of a main clutch such as low-speed hydraulic clutch CL. In addition, the drag-preventing clutch apparatus to be pressed against a flywheel (dry type clutch apparatus A in the embodiment) may be provided without regard to the number of hydraulic clutches in a shift mechanism.

While there have been described herein what are considered to be most preferred embodiments of the present invention, other modifications of the invention shall be thought of to those skilled in the art as far as it does not depart from the sprit of the invention. That is, the technical scope of the invention is limited by only the scope of the appended claims.

INDUSTRIAL FIELD OF THE INVENTION

The present invention is applied to a vehicle, for example, a tractor or the like using a wet type clutch as a main clutch to engage/disengage a power train input from engine power and as a clutch for shifting.

What is claimed is:

1. A transmission system for a vehicle, comprising:
    a wet type clutch provided as a main clutch which is engaged/disengaged in a power train from a prime mover;

a drag-preventing clutch apparatus for preventing a drag located on the upstream side of said wet type clutch, wherein said drag-preventing clutch apparatus is disengaged and completes engaging while said wet type clutch is disengaged till the minimum hydraulic fluid pressure for engaging said wet type clutch rises in said wet type clutch; and a common clutch operation device for disengaging both said wet type clutch and said drag-preventing clutch apparatus.

2. The transmission system for a vehicle as set forth in claim 1, wherein a multi-plate clutch is used as said wet type clutch.

3. The transmission system for a vehicle as set forth in claim 1, wherein a dry type single-plate clutch is used as said drag-preventing clutch apparatus.

4. The transmission system for a vehicle as set forth in claim 1, further comprising:

one housing containing said drag-preventing clutch apparatus and said wet type clutch; and an actuator for actuating said drag-preventing clutch apparatus, wherein said actuator is located above said housing.

5. The transmission system for a vehicle as set forth in claim 4, said actuator being hydraulically controlled, further comprising:

a hydraulic control apparatus for said wet type clutch; and control means for supplying/draining hydraulic oil to/from said actuator, wherein said control means is incorporated in said hydraulic control apparatus for said wet type clutch.

6. The transmission system for a vehicle as set forth in claim 1, further comprising:

a shift mechanism having a plurality of wet type clutches for shifting, among which one clutch is selectively engaged so as to establish one determined speed stage, wherein said plurality of wet type clutches for shifting are used also as a main clutch so that all of said wet type clutches are disengaged for cutting off power transmission from said prime mover.

7. The transmission system for a vehicle as set forth in claim 6, wherein one among said plurality of wet type clutches is defined as a clutch for inching which is half-engaged during a transition period between a main-clutch-off state where all said wet type clutches are disengaged and a main-clutch-on state where one selected from said wet type clutches may be engaged.

8. The transmission system for a vehicle as set forth in claim 7, wherein at least said clutch for inching is a multi-plate type clutch among said plurality of wet type clutches.

9. A transmission system for a vehicle, comprising:

a wet type clutch provided as a main clutch which is engaged/disengaged in a power train from a prime mover;

a drag-preventing clutch apparatus for preventing a drag located on the upstream side of said wet type clutch; and main clutch operation means for switching transmission/isolation of power of said prime mover to/from said transmission system, wherein the full range of stroke of said main clutch operation means is divided into a main-clutch-on range (D1) for engaging said wet type clutch and a main-clutch-off range (D3) for disengaging said wet type clutch, and wherein said drag-preventing clutch is disengaged and completes engaging while said main clutch operation means is located in said main-clutch-off range.

10. The transmission system for a vehicle as set forth in claim 9, wherein said full range of stroke of said main clutch operation means is further divided into an inching range (D2) for half-engaging of said wet type clutch between said main-clutch-on range and said main-clutch-off range, wherein a border between said main-clutch-off range and said inching range is set to a stroke position of said main clutch operation means where the minimum hydraulic fluid pressure for half-engaging said wet type clutch rises, and wherein said wet type clutch is free of actuation till the minimum hydraulic fluid pressure rises in said wet type clutch while said main clutch operation means is located in said main-clutch-off range.

11. A transmission system for a vehicle, comprising:

a shift mechanism having a plurality of wet type clutches for shifting among which one clutch is selectively engaged to establish one determined speed stage, wherein said transmission system is isolated from power of a prime mover by disengaging all said wet type clutches, and wherein one of said plurality of wet type clutches is defined as a clutch for inching so as to be half-engaged during a transition period between a main-clutch-off state where all said wet type clutches are disengaged and a main-clutch-on state where one selected from said wet type clutches may be engaged.

12. The transmission system for a vehicle as set forth in claim 11, wherein a wet type clutch having the largest volume among said plurality of wet type clutches is used as said clutch for inching.

13. The transmission system for a vehicle as set forth in claim 11, wherein a wet type clutch for the lowest speed stage among said plurality of wet type clutches is used as said clutch for inching.

14. The transmission system for a vehicle as set forth in claim 11, wherein at least said clutch for inching is a multi-plate type clutch among said plurality of wet type clutches.

15. The transmission system for a vehicle as set forth in claim 11, further comprising: main clutch operation means for switching transmission/isolation of power of said prime mover to/from said transmission system, wherein the full range of stroke of said main clutch operation means is divided into a main-clutch-on range (D1) where one of said wet type clutches is selected to be engaged corresponding to one determined speed stage, an inching range (D2) where said clutch for inching is half-engaged, and a main-clutch-off range (D3) where all said wet type clutches are disengaged.

16. The transmission system for a vehicle as set forth in claim 15, wherein clutch-engaging hydraulic pressure of said clutch for inching increases as a stroke of said main clutch operation means within said inching range varies from said main-clutch-off range toward said main-clutch-on range, and wherein a border between said inching range and said main-clutch-on range is set to a stroke position where said clutch-engaging hydraulic pressure is less than the maximum hydraulic pressure.

17. The transmission system for a vehicle as set forth in claim 15, wherein clutch-engaging hydraulic pressure of said clutch for inching increases as a stroke of said main clutch operation means within said inching range varies from said main-clutch-off range toward said main-clutch-on range, and wherein a border between said inching range and said main-clutch-on range is set to a stroke position where said clutch-engaging hydraulic pressure reaches the maximum hydraulic pressure.

18. The transmission system for a vehicle as set forth in claim 15, wherein said main-clutch-off range is set corresponding to a stroke range of said main clutch operation means where all said wet type clutches are free of actuation till the minimum hydraulic fluid pressure rises in each of said wet type clutches.

19. The transmission system for a vehicle as set forth in claim 15, said plurality of wet type clutches of said shift mechanism being engaged by supply of hydraulic oil, and disengaged by draining hydraulic oil, further comprising:

an oil path switching valve serving as one of hydraulic pressure control devices for controlling flow course of hydraulic oil to each of said wet type clutches of said shift mechanism, wherein, if said one of said wet type clutches selected to be engaged corresponding to one determined speed stage is not said clutch for inching and said main clutch operation means is located in either said main-clutch-off range or said inching range, said oil path switching valve connects a supply path of hydraulic oil to said clutch for inching and connects a drain oil path to said wet type clutch essentially selected to be engaged.

20. The transmission system for a vehicle as set forth in claim 19, further comprising:

shift operation means for setting a speed stage of said shift mechanism, wherein said oil path switching valve is made of an electromagnetic solenoid which is switched based on the detection of a position of said shift operation means and on the detection of a position of said main clutch operation means.

21. The transmission system for a vehicle as set forth in claim 11, further comprising:

a shift mechanism having a plurality of wet type clutches for shifting among which one is selectively engaged so as to establish one determined speed stage, wherein said shift control mechanism controls the flow of hydraulic oil for controlling engagement/ disengagement of each of said wet type clutches; and throttle mechanisms provided in respective oil paths which are connected with said respective wet type clutches and allow hydraulic oil to flow therethrough when said respective wet type clutches are disengaged.

22. The transmission system for a vehicle as set forth in claim 11, further comprising:

a shift mechanism having a plurality of wet type clutches for shifting among which one is selectively engaged so as to establish one determined speed stage, wherein said shift control mechanism controls the flow of hydraulic oil for controlling engagement/ disengagement of each of said wet type clutches; and a delay relief valve provided to delay a hydraulic pressure rise in an oil path which communicates hydraulic oil to one of said wet type clutches selectively engaged after said one of wet type clutches is selected in place of another wet type clutch for shifting.

* * * * *

UNITED STATES PATENT AND TRADEMARK OFFICE
CERTIFICATE OF CORRECTION

PATENT NO.   : 6,450,309 B1
DATED        : September 17, 2002
INVENTOR(S)  : Hirai et al.

It is certified that error appears in the above-identified patent and that said Letters Patent is hereby corrected as shown below:

<u>Title page,</u>
Item [73], Assignee, please add -- Yanmar Diesel Engine Co., Ltd. --.

Signed and Sealed this

Twenty-fifth Day of October, 2005

JON W. DUDAS
*Director of the United States Patent and Trademark Office*